US010790890B2

(12) United States Patent
Chen et al.

(10) Patent No.: US 10,790,890 B2
(45) Date of Patent: Sep. 29, 2020

(54) CSI FEEDBACK METHOD, PRECODING METHOD, TERMINAL AND BASE STATION

(71) Applicant: China Academy of Telecommunications Technology, Beijing (CN)

(72) Inventors: Wenhong Chen, Beijing (CN); Qiubin Gao, Beijing (CN); Hui Li, Beijing (CN); Runhua Chen, Beijing (CN); Tamrakar Rakesh, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 0 days.

(21) Appl. No.: 16/086,009

(22) PCT Filed: Dec. 29, 2016

(86) PCT No.: PCT/CN2016/113160
§ 371 (c)(1),
(2) Date: Sep. 18, 2018

(87) PCT Pub. No.: WO2017/157082
PCT Pub. Date: Sep. 21, 2017

(65) Prior Publication Data

US 2019/0089437 A1 Mar. 21, 2019

(30) Foreign Application Priority Data

Mar. 18, 2016 (CN) .......................... 2016 1 0158995

(51) Int. Cl.
*H04B 7/06* (2006.01)
*H04L 5/00* (2006.01)
*H04B 7/0456* (2017.01)

(52) U.S. Cl.
CPC ......... *H04B 7/0626* (2013.01); *H04B 7/0456* (2013.01); *H04B 7/0478* (2013.01);
(Continued)

(58) Field of Classification Search
None
See application file for complete search history.

(56) References Cited

U.S. PATENT DOCUMENTS

2013/0155897 A1* 6/2013 Ihm ........................ H04B 7/024 370/252
2013/0343299 A1 12/2013 Sayana et al.
(Continued)

FOREIGN PATENT DOCUMENTS

CN 102170334 A 8/2011
CN 102546110 A 7/2012
(Continued)

OTHER PUBLICATIONS

Samsung: "Schemes for Class B CSI Reporting for Rel.13", 3GPP Draft; R1-155499 Class B Scheme, 3rd Generation Partnership Project (3GPP), Mobile Competence Centre ; 650, Route Des Lucioles; F-06921 Sophia-Antipolis Cedex ; France, RAN WG1, No. Malmo, Sweden; Oct. 5, 2015-Oct. 9, 2015 Oct. 4, 2015, 6 pages.
(Continued)

*Primary Examiner* — Eunsook Choi
(74) *Attorney, Agent, or Firm* — Kilpatrick Townsend & Stockton, LLP

(57) ABSTRACT

Disclosed in the present invention are a channel state information (CSI) feedback method, a precoding method, a terminal and a base station. The channel state information (CSI) feedback method disclosed in the present invention comprises: a terminal selects a channel state information-reference signal (CSI-RS) resource or a CSI-RS port on a
(Continued)

The base station receives feedback of one or more CQIs, and feedback of indication information of one or more selected CSI-RS resources in a prescribed sub-band or feedback of indication information of one or more selected CSI-RS ports in the prescribed sub-band, fed back by a terminal — 501

The base station determines a modulation and coding scheme for downlink transmission according to the one or more CQIs — 502

The base station determines a pre-coding matrix set and one or more beam-forming vectors according to the indication information of the one or more selected CSI-RS resources in the prescribed sub-band or according to the indication information of the one or more selected CSI-RS ports in the prescribed sub-band — 503

The base station pre-codes data to be transmitted over one or more physical resources in the prescribed sub-band according to both the determined pre-coding matrix set and the one or more determined beam-forming vectors — 504 convention subband from among a CSI-RS resource set as configured in a base station according to downlink channel information; the terminal measures a channel quality indicator (CQI) according to the selected CSI-RS resource or CSI-RS port and a precoding matrix set corresponding to the selected CSI-RS resource or CSI-RS port, wherein the precoding matrix set includes one or more preceding matrices, and a physical resource on the convention subband corresponds to a precoding matrix in the precoding matrix set; and the terminal feeds back the CQI and indication information of the selected CSI-RS resource or CSI-RS port. According to the present invention, the matching degree between CSI and channel state may be improved.

16 Claims, 4 Drawing Sheets

(52) U.S. Cl.
CPC ......... *H04B 7/0617* (2013.01); *H04B 7/0632* (2013.01); *H04L 5/0048* (2013.01)

(56) References Cited

U.S. PATENT DOCUMENTS

2017/0063503 A1* 3/2017 Liu ........................ H04L 25/03
2017/0237478 A1* 8/2017 Kwak .................. H04L 5/0051 370/329
2017/0264405 A1* 9/2017 Gao ..................... H04B 7/0417
2018/0198499 A1* 7/2018 Park ..................... H04B 7/0473
2018/0343046 A1* 11/2018 Park ..................... H04B 7/0478
2019/0131008 A1* 5/2019 Gao ....................... G06Q 50/22
2019/0319682 A1* 10/2019 Zhang .................. H04B 7/0626

FOREIGN PATENT DOCUMENTS

| | | | |
|---|---|---|---|
| CN | 103326761 | A | 9/2013 |
| CN | 103391127 | A | 11/2013 |
| CN | 104350689 | A | 2/2015 |
| CN | 104508997 | A | 4/2015 |
| CN | 104584450 | A | 4/2015 |
| CN | 104885499 | A | 9/2015 |
| KR | 20110109992 | A | 10/2011 |

OTHER PUBLICATIONS

Intel Corporation: “Views on class B CSI reporting”, 3GPP Draft; R1-155321 Views on Class B CSI Reporting, 3rd Generation Partnership Project (3GPP), Mobile Competence Centre ; 650, Routes Des Lucioles; F-06921 Sophia-Antipolis Cedex; France, RAN WG1, No. Beijing, China; Aug. 24, 2015-Aug. 28, 2015 , Oct. 4, 2015, 3 pages.

* cited by examiner

CSI FEEDBACK METHOD, PRECODING METHOD, TERMINAL AND BASE STATION

This application is a US National Stage of International Application No. PCT/CN2016/113160, filed Dec. 29, 2016, designating the United States and claiming the benefit of Chinese Patent Application No. 201610158995.3, filed with the Chinese Patent Office on Mar. 18, 2016, and entitled "A method and apparatus for providing feedback of CSI, and a pre-coding method and apparatus". The entire disclosure of the application above is incorporated herein by reference.

FIELD

The present disclosure relates to the field of communications, and particularly to a method and apparatus for providing feedback of Channel State Information (CSI), and a pre-coding method, a terminal and a base station.

BACKGROUND

Mobility and a wideband has become a development trend of modern communication technologies, and the $3^{rd}$ Generation Partnership Project (3GPP) has been devoted to a long Term Evolution (LTE) system evolving from a 3G system with the aim of developing the 3GPP radio access technologies toward a high data ratio, a short delay, and optimized packet data applications. The Multi-input Multi-Output (MIMO) technology at the physical layer has become one of crucial technologies in the existing mobile communication system due to a number of advantages thereof, for example, the capacity of the system is extended through space division multiplexing of multiple antennas, the throughput of the system is improved using a multiplexing gain of multiple antennas, etc.

After a base station obtains some CSI (which can be an instantaneous value, or can be short-term or middle- to long-term statistic information), it can optimize power, rates, and even transmit directions applied to respective data streams in some preprocessing scheme, and possibly a part or all of interference between the data streams may be eliminated in advance at a terminal through preprocessing, thus achieving higher performance.

Accordingly it is highly desirable in the industry to improve the extent of matching the CSI fed back by the terminal with a channel state.

SUMMARY

Embodiments of the disclosure provide a method for providing feedback of CSI, a pre-coding method, a terminal and a base station so as to improve the extent of matching the CSI with a channel state.

In a first aspect, a method for providing feedback of CSI is provided. The method includes: selecting, by a terminal, one or more Channel State Information-Reference Signal (CSI-RS) resources in a prescribed sub-band or one or more CSI-RS ports in the prescribed sub-band, from a CSI-RS resource set configured by a base station according to downlink channel information; measuring, by the terminal, one or more Channel Quality Indicators (CQIs) according to the one or more selected CSI-RS resources or according to the one or more selected CSI-RS ports, and according to a pre-coding matrix set corresponding to the one or more selected CSI-RS resources or corresponding to the one or more selected CSI-RS ports, where the pre-coding matrix set includes one or more pre-coding matrixes, and each of one or more physical resources in the prescribed sub-band corresponds to one of the one or more pre-coding matrixes in the pre-coding matrix set; and providing, by the terminal, feedback of the one or more CQIs, and feedback of indication information of the one or more selected CSI-RS resources or feedback of indication information of the one or more selected CSI-RS ports.

In an implementation, measuring, by the terminal, the one or more CQIs according to the one or more selected CSI-RS resources or according to the one or more selected CSI-RS ports, and according to the pre-coding matrix set corresponding to the one or more selected CSI-RS resources or corresponding to the one or more selected CSI-RS ports includes: measuring, by the terminal, the one or more CQIs according to the downlink channel information, and according to one or more pre-coding matrixes corresponding to the one or more physical resources in the prescribed sub-band, where the one or more pre-coding matrixes are one or more pre-coding matrixes in the pre-coding matrix set corresponding to the one or more selected CSI-RS resources or corresponding to the one or more selected CSI-RS ports.

In an implementation, measuring, by the terminal, the one or more CQIs according to the one or more selected CSI-RS resources, and according to the pre-coding matrix set corresponding to the one or more selected CSI-RS resources includes: measuring, by the terminal, one or more CQIs for downlink channel information corresponding to each of the one or more selected CSI-RS resources according to the pre-coding matrix set, and obtaining the one or more CQIs corresponding to each of the one or more selected CSI-RS resources; or, combining, by the terminal, the downlink channel information corresponding to each of the selected CSI-RS resources, measuring a CQI for the combined downlink channel information according to the pre-coding matrix set, and obtaining a joint CQI corresponding to the selected CSI-RS resources.

In an implementation, measuring, by the terminal, the one or more CQIs according to the one or more selected CSI-RS ports, and according to the pre-coding matrix set corresponding to the one or more selected CSI-RS ports includes: measuring, by the terminal, one or more CQIs for downlink channel information corresponding to the one or more selected CSI-RS ports according to the pre-coding matrix set, and obtaining the one or more CQIs corresponding to the one or more selected CSI-RS ports; or, measuring, by the terminal, one or more CQIs according to downlink channel information corresponding to one or more CSI-RS resources configured by the base station, and according to the pre-coding matrix set corresponding to the one or more selected CSI-RS ports, and obtaining the one or more CQIs corresponding to the one or more selected CSI-RS ports.

In an implementation, the terminal selects the one or more CSI-RS resources in the prescribed sub-band or the one or more CSI-RS ports in the prescribed sub-band from the CSI-RS resource set configured by the base station based upon a predetermined Rank Indicator (RI) and based upon downlink channel information.

In an implementation, the terminal determines the number of the one or more selected CSI-RS resources or the number of the one or more selected CSI-RS ports according to the RI.

In an implementation, the RI is an RI lastly fed back by the terminal; or the RI is indicated by the base station to the terminal.

In an implementation, selecting, by the terminal, the one or more CSI-RS resources in the prescribed sub-band or the one or more CSI-RS ports in the prescribed sub-band from the CSI-RS resource set configured by the base station according to the downlink channel information includes: determining, by the terminal, transmission performance information corresponding to one or more CSI-RS resources in the CSI-RS resource set configured by the base station or corresponding to one or more CSI-RS ports in the CSI-RS resource set configured by the base station according to the downlink channel information corresponding to the one or more CSI-RS resources in the CSI-RS resource set configured by the base station or corresponding to the one or more CSI-RS ports in the CSI-RS resource set configured by the base station; or determining, by the terminal, the transmission performance information corresponding to the one or more CSI-RS resources in the CSI-RS resource set configured by the base station or corresponding to the one or more CSI-RS ports in the CSI-RS resource set configured by the base station according to one or more results calculated from both a pre-coding matrix set and the downlink channel information corresponding to the one or more CSI-RS resources in the CSI-RS resource set configured by the base station or corresponding to the one or more CSI-RS ports in the CSI-RS resource set configured by the base station; and, selecting, by the terminal, the one or more CSI-RS resources in the prescribed sub-band or the one or more CSI-RS ports in the prescribed sub-band from the CSI-RS resource set configured by the base station according to the determined transmission performance information.

In an implementation, the indication information of the one or more selected CSI-RS resources is one or more indexes of the one or more selected CSI-RS resources in the CSI-RS resource set configured by the base station.

In an implementation, the indication information of the one or more selected CSI-RS ports is one or more indexes of the one or more selected CSI-RS ports among all CSI-RS ports included by one or more CSI-RS resources configured by the base station; or, the indication information of the one or more selected CSI-RS ports is one or more indexes, of the pre-coding matrix set corresponding to the one or more selected CSI-RS ports, in a predefined codebook.

In an implementation, the pre-coding matrix set corresponding to the one or more selected CSI-RS resources is agreed on in advance between the terminal and the base station.

In an implementation, each of the one or more pre-coding matrixes in the pre-coding matrix set corresponding to the one or more selected CSI-RS ports consists of one or more column selection vectors or a column selection vector group, where an element in each of the one or more column selection vectors is 1, and all other elements are 0; or, the pre-coding matrix set corresponding to the one or more selected CSI-RS ports is obtained according to one or more column selection vectors and according to a phase set, or according to both a column selection vector group and the phase set, where the phase set includes one or more phase factors, and each of the one or more pre-coding matrixes in the pre-coding matrix set is obtained based upon one of the one or more phase factors.

In an implementation, each column vector in each pre-coding matrix in the pre-coding matrix set corresponding to the one or more selected CSI-RS ports consists of M concatenated column selection vectors, M is the number of the one or more selected CSI-RS ports, one or more ports corresponding to M elements each having a value of 1 in the M column selection vectors constitute the one or more selected CSI-RS ports, and M is an integer more than or equal to 1.

In an implementation, obtaining the pre-coding matrix set according to the column selection vector and according to the phase set, or according to both the column selection vector group and the phase set includes: performing a Kronecker product operation on both a phase matrix obtained based upon a phase factor and the column selection vector or column selection vectors in the column selection vector group, and constituting a pre-coding matrix consisting of column vectors in a matrix obtained as a result of the operation.

In an implementation, an i-th physical resource in the prescribed sub-band corresponds to a k-th pre-coding matrix in the pre-coding matrix set. $k=i \bmod K$, where $i=0, 1, 2 \ldots N$, $k=0, 1, 2, 3, \ldots, K-1$, K is the number of the one or more pre-coding matrixes in the pre-coding matrix set, and N is the number of the one or more physical resources in the sub-band. Or, $k=\mathrm{ceil}(i/v) \bmod K$, where $\mathrm{ceil}(i/v)$ represents a minimum integer no less than $i/v$, $v=RI$, or v is the number of one or more antenna ports, $i=0, 1, 2 \ldots N$, $k=0, 1, 2, 3, \ldots, K-1$, K is the number of the one or more pre-coding matrixes in the pre-coding matrix set, and N is the number of the one or more physical resources in the sub-band.

In an implementation, the prescribed sub-band includes one or more Physical Resource Blocks (PRBs).

In an implementation, the one or more physical resources are one or more REs, one or more sub-carriers, one or more PRBs, or one or more PRB sets; or the one or more physical resources are one or more REs, one or more sub-carriers, one or more PRBs, or one or more PRB sets for transmitting one or more data symbols.

In a second aspect, a terminal is provided, the terminal includes: a selecting module configured to select one or more CSI-RS resources in a prescribed sub-band or one or more CSI-RS ports in the prescribed sub-band, from a CSI-RS resource set configured by a base station according to downlink channel information; a measuring module configured to measure one or more CQIs according to the one or more selected CSI-RS resources or according to the one or more selected CSI-RS ports, and according to a pre-coding matrix set corresponding to the one or more selected CSI-RS resources or corresponding to the one or more selected CSI-RS ports, where the pre-coding matrix set includes one or more pre-coding matrixes, and each of one or more physical resources in the prescribed sub-band corresponds to one of the one or more pre-coding matrixes in the pre-coding matrix set; and a feedback module configured to provide feedback of the one or more CQIs, and feedback of indication information of the one or more selected CSI-RS resources or feedback of indication information of the one or more selected CSI-RS ports.

In an implementation, the measuring module is configured to: measure the one or more CQIs according to the downlink channel information, and according to one or more pre-coding matrixes corresponding to the one or more physical resources in the prescribed sub-band, where the one or more pre-coding matrixes are one or more pre-coding matrixes in the pre-coding matrix set corresponding to the one or more selected CSI-RS resources or corresponding to the one or more selected CSI-RS ports.

In an implementation, the selecting module is configured to select the one or more CSI-RS resources in the prescribed sub-band from the CSI-RS resource set configured by the base station; and the measuring module is configured to: measure one or more CQIs for downlink channel information corresponding to each of the one or more selected CSI-RS resources according to the pre-coding matrix set, and obtain the one or more CQIs corresponding to each of the one or more selected CSI-RS resources; or, combine the downlink channel information corresponding to each of the selected CSI-RS resources, measure a CQI for the combined downlink channel information according to the pre-coding matrix set, and obtain a joint CQI corresponding to the selected CSI-RS resources.

In an implementation, the selecting module is configured to select the one or more CSI-RS ports in the prescribed sub-band from the CSI-RS resource set configured by the base station; and the measuring module is configured to: measure one or more CQIs for downlink channel information corresponding to the one or more selected CSI-RS ports according to the pre-coding matrix set, and obtain the one or more CQIs corresponding to the one or more selected CSI-RS ports; or, measure one or more CQIs according to downlink channel information corresponding to one or more CSI-RS resources configured by the base station, and according to the pre-coding matrix set corresponding to the one or more selected CSI-RS ports, and obtain the one or more CQIs corresponding to the one or more selected CSI-RS ports.

In an implementation, the selecting module is configured to select the one or more CSI-RS resources in the prescribed sub-band or the one or more CSI-RS ports in the prescribed sub-band from the CSI-RS resource set configured by the base station based upon a predetermined RI and based upon downlink channel information.

In an implementation, the selecting module is configured to determine the number of the one or more selected CSI-RS resources or the number of the one or more selected CSI-RS ports according to the RI.

In an implementation, the RI is an RI lastly fed back by the terminal; or the RI is indicated by the base station to the terminal.

In an implementation, the selecting module is configured to: determine transmission performance information corresponding to one or more CSI-RS resources in the CSI-RS resource set configured by the base station or corresponding to one or more CSI-RS ports in the CSI-RS resource set configured by the base station according to the downlink channel information corresponding to the one or more CSI-RS resources in the CSI-RS resource set configured by the base station or corresponding to the one or more CSI-RS ports in the CSI-RS resource set configured by the base station; or determine transmission performance information corresponding to the one or more CSI-RS resources in the CSI-RS resource set configured by the base station or corresponding to the one or more CSI-RS ports in the CSI-RS resource set configured by the base station according to one or more results calculated from both a pre-coding matrix set and the downlink channel information corresponding to the one or more CSI-RS resources in the CSI-RS resource set configured by the base station or corresponding to the one or more CSI-RS ports in the CSI-RS resource set configured by the base station; and, select the one or more CSI-RS resources in the prescribed sub-band or the one or more CSI-RS ports in the prescribed sub-band from the CSI-RS resource set configured by the base station according to the determined transmission performance information.

In an implementation, the indication information of the one or more selected CSI-RS resources is one or more indexes of the one or more selected CSI-RS resources in the CSI-RS resource set configured by the base station.

In an implementation, the indication information of the one or more selected CSI-RS ports is one or more indexes of the one or more selected CSI-RS ports among all CSI-RS ports included by one or more CSI-RS resources configured by the base station; or, the indication information of the one or more selected CSI-RS ports is one or more indexes, of the pre-coding matrix set corresponding to the one or more selected CSI-RS ports, in a predefined codebook.

In an implementation, the pre-coding matrix set corresponding to the one or more selected CSI-RS resources is agreed on in advance between the terminal and the base station.

In an implementation, each of the one or more pre-coding matrixes in the pre-coding matrix set corresponding to the one or more selected CSI-RS ports consists of one or more column selection vectors or a column selection vector group, where an element in each of the one or more column selection vectors is 1, and all other elements are 0; or, the pre-coding matrix set corresponding to the one or more selected CSI-RS ports is obtained according to one or more column selection vectors and according to a phase set, or according to both a column selection vector group and the phase set, where the phase set includes one or more phase factors, and each of the one or more pre-coding matrixes in the pre-coding matrix set is obtained based upon one of the one or more phase factors.

In an implementation, each column vector in each pre-coding matrix in the pre-coding matrix set corresponding to the one or more selected CSI-RS ports consists of M concatenated column selection vectors, M is the number of the one or more selected CSI-RS ports, one or more ports corresponding to M elements each having a value of 1 in the M column selection vectors constitute the one or more selected CSI-RS ports, and M is an integer more than or equal to 1.

In an implementation, obtaining the pre-coding matrix set according to the column selection vector and according to the phase set, or according to both the column selection vector group and the phase set includes: performing a Kronecker product operation on both a phase matrix obtained based upon a phase factor and the column selection vector or column selection vectors in the column selection vector group, and constituting a pre-coding matrix consisting of column vectors in a matrix obtained as a result of the operation.

In an implementation, an i-th physical resource in the prescribed sub-band corresponds to a k-th pre-coding matrix in the pre-coding matrix set. $k=i \bmod K$, where $i=0, 1, 2 \ldots N$, $k=0, 1, 2, 3 \ldots, K-1$, K is the number of the one or more pre-coding matrixes in the pre-coding matrix set, and N is the number of the one or more physical resources in the sub-band. Or, $k=\mathrm{ceil}(i/v) \bmod K$, where $\mathrm{ceil}(i/v)$ represents a minimum integer no less than $i/v$, $v=RI$, or v is the number of one or more antenna ports, $i=0, 1, 2 \ldots N$, $k=0, 1, 2, 3, \ldots, K-1$, K is the number of the one or more pre-coding matrixes in the pre-coding matrix set, and N is the number of the one or more physical resources in the sub-band.

In an implementation, the prescribed sub-band includes one or more PRBs.

In an implementation, the one or more physical resources are one or more REs, one or more sub-carriers, one or more PRBs, or one or more PRB sets; or the one or more physical resources are one or more REs, one or more sub-carriers, one or more PRBs, or one or more PRB sets for transmitting one or more data symbols.

In a third aspect, a pre-coding method is provided so as to improve the extent of matching pre-coded data with a channel state.

An embodiment of the disclosure provides a pre-coding method. The method includes: receiving, by a base station, feedback of one or more CQIs, and feedback of indication information of one or more selected CSI-RS resources in a prescribed sub-band or feedback of indication information of one or more selected CSI-RS ports in the prescribed sub-band, fed back by a terminal; determining, by the base station, a modulation and coding scheme for downlink transmission according to the one or more CQIs; determining, by the base station, a pre-coding matrix set and one or more beam-forming vectors according to the indication information of the one or more selected CSI-RS resources in the prescribed sub-band or according to the indication information of the one or more selected CSI-RS ports in the prescribed sub-band; and, pre-coding, by the base station, data to be transmitted over one or more physical resources in the prescribed sub-band according to both the determined pre-coding matrix set and the one or more determined beam-forming vectors.

In an implementation, the pre-coding matrix set and the one or more beam-forming vectors are determined by the base station according to the indication information of the one or more selected CSI-RS resources or according to the indication information of the one or more selected CSI-RS ports in the prescribed sub-band.

In an implementation, pre-coding, by the base station, the data to be transmitted over the one or more physical resources in the prescribed sub-band according to both the determined pre-coding matrix set and the one or more determined beam-forming vectors includes: performing, by the base station, a calculation operation on both one or more pre-coding matrixes in a determined first pre-coding matrix set and the one or more determined beam-forming vectors, and obtaining a second pre-coding matrix set for pre-coding, where the second pre-coding matrix set includes one or more pre-coding matrixes, and each physical resource in the prescribed sub-band corresponds to one of the one or more pre-coding matrixes in the second pre-coding matrix set; and, pre-coding, by the base station, the data to be transmitted over the one or more physical resources in the prescribed sub-band according to the one or more pre-coding matrixes in the second pre-coding matrix set.

In an implementation, the pre-coding matrix set and the one or more beam-forming vectors are determined by the base station according to the indication information of the one or more selected CSI-RS ports in the prescribed sub-band. Pre-coding, by the base station, the data to be transmitted over the one or more physical resources in the prescribed sub-band according to both the determined pre-coding matrix set and the one or more determined beam-forming vectors includes: replacing, by the base station, each column selection vector in each pre-coding matrix in the determined pre-coding matrix set with one of the one or more beam-form vectors corresponding to the column selection vector, respectively, and obtaining the second pre-coding matrix set for pre-coding, where each column vector in each pre-coding matrix consists of M concatenated column selection vectors, each column of the M selection vectors corresponds to a CSI-RS port, the second pre-coding matrix set includes one or more pre-coding matrixes, each physical resource in the prescribed sub-band corresponds to one of the one or more pre-coding matrixes in the second pre-coding matrix set, and M is an integer more than or equal to 1; and, pre-coding, by the base station, the data to be transmitted over the one or more physical resources in the prescribed sub-band according to the one or more pre-coding matrixes in the second pre-coding matrix set.

In an implementation, an i-th physical resource in the prescribed sub-band corresponds to a k-th pre-coding matrix in the second pre-coding matrix set, where: $k=i \bmod K$, where $i=0, 1, 2 \ldots N$, $k=0, 1, 2, 3, \ldots, K-1$, K is the number of the one or more pre-coding matrixes in the second pre-coding matrix set, and N is the number of the one or more physical resources in the sub-band; or, $k=\text{ceil}(i/v) \bmod K$, where ceil(i/v) represents a minimum integer no less than i/v, v=RI, or v is the number of one or more antenna ports, $i=0, 1, 2 \ldots N$, $k=0, 1, 2, 3, \ldots, K-1$. K is the number of the one or more pre-coding matrixes in the second pre-coding matrix set, and N is the number of the one or more physical resources in the sub-band.

In an implementation, the indication information of the one or more selected CSI-RS resources is one or more indexes of the one or more selected CSI-RS resources in a CSI-RS resource set configured by the base station.

In an implementation, the indication information of the one or more selected CSI-RS ports is one or more indexes of the one or more selected CSI-RS ports among all CSI-RS ports included by one or more CSI-RS resources configured by the base station; or, the indication information of the one or more selected CSI-RS ports is one or more indexes, of the pre-coding matrix set corresponding to the one or more selected CSI-RS ports, in a predefined codebook.

In a fourth aspect, a base station is provided. The base station includes: a receiving module configured to receive feedback of one or more CQIs, and feedback of indication information of one or more selected CSI-RS resources in a prescribed sub-band or feedback of indication information of one or more selected CSI-RS ports in the prescribed sub-band, fed back by a terminal; a first determining module configured to determine a modulation and coding scheme for downlink transmission according to the one or more CQIs; a second determining module configured to determine a pre-coding matrix set and one or more beam-forming vectors according to the indication information of the one or more selected CSI-RS resources in the prescribed sub-band or according to the indication information of the one or more selected CSI-RS ports in the prescribed sub-band; and, a pre-coding module configured to pre-code data to be transmitted over one or more physical resources in the prescribed sub-band according to both the determined pre-coding matrix set and the one or more determined beam-forming vectors.

In an implementation, the pre-coding matrix set and the one or more beam-forming vectors are determined by the second determining module according to the indication information of the one or more selected CSI-RS resources or according to the indication information of the one or more CSI-RS ports in the prescribed sub-band. The pre-coding module is configured to: perform a calculation operation on both one or more pre-coding matrixes in a determined first pre-coding matrix set and the one or more determined beam-forming vectors, and obtain a second pre-coding matrix set for pre-coding, where the second pre-coding matrix set includes one or more pre-coding matrixes, and each physical resource in the prescribed sub-band corresponds to one of the one or more pre-coding matrixes in the second pre-coding matrix set; and pre-code the data to be transmitted over the one or more physical resources in the prescribed sub-band according to the one or more pre-coding matrixes in the second pre-coding matrix set.

In an implementation, the pre-coding matrix set and the one or more beam-forming vectors are determined by the second determining module according to the indication information of the one or more selected CSI-RS ports in the prescribed sub-band. The pre-coding module is configured to: replace each column selection vector in each pre-coding matrix in the determined pre-coding matrix set with one of the one or more beam-form vectors corresponding to the column selection vector, respectively, and obtain the second pre-coding matrix set for pre-coding, where each column vector in each pre-coding matrix consists of M concatenated column selection vectors, each column of the M selection vectors corresponds to a CSI-RS port, the second pre-coding matrix set includes one or more pre-coding matrixes, each physical resource in the prescribed sub-band corresponds to one of the one or more pre-coding matrixes in the second pre-coding matrix set, and M is an integer more than or equal to 1; and, pre-code the data to be transmitted over the physical resources in the prescribed sub-band according to the one or more pre-coding matrixes in the second pre-coding matrix set.

In an implementation, an i-th physical resource in the prescribed sub-band corresponds to a k-th pre-coding matrix in the second pre-coding matrix set, where: k=i mod K, where i=0, 1, 2 . . . N, k=0, 1, 2, 3, . . . , K−1, K is the number of the one or more pre-coding matrixes in the second pre-coding matrix set, and N is the number of the one or more physical resources in the sub-band; or, k=ceil(i/v) mod K, where ceil(i/v) represents a minimum integer no less than i/v, v=RI, or v is the number of one or more antenna ports, i=0, 1, 2 . . . N, k=0, 1, 2, 3, . . . , K−1, K is the number of the one or more pre-coding matrixes in the second pre-coding matrix set, and N is the number of the one or more physical resources in the sub-band.

In an implementation, the indication information of the one or more selected CSI-RS resources is one or more indexes of the one or more selected CSI-RS resources in a CSI-RS resource set configured by the base station.

In an implementation, the indication information of the one or more selected CSI-RS ports is one or more indexes of the one or more selected CSI-RS ports among all CSI-RS ports included by one or more CSI-RS resources configured by the base station; or, the indication information of the one or more selected CSI-RS ports is one or more indexes, of the pre-coding matrix set corresponding to the one or more selected CSI-RS ports, in a predefined codebook.

BRIEF DESCRIPTION OF THE DRAWINGS

In order to make the technical solutions according to the embodiments of the disclosure more apparent, the drawings to which a description of the embodiments refers to will be introduced below in brief; and apparently the drawings to be described are only some embodiments of the disclosure, and those ordinarily skilled in the art can further derive other drawings from these drawings without any inventive effort.

DETAILED DESCRIPTION OF THE EMBODIMENTS

In order to make the objects, technical solutions, and advantages of the embodiments of the disclosure more apparent, the disclosure will be described below in further details with reference to the drawings, and apparently the embodiments to be described are only a part but not all of the embodiments of the disclosure. Based upon the embodiments here of the disclosure, all the other embodiments which can occur to those ordinarily skilled in the art without any inventive effort shall fall into the scope of the disclosure.

Figure 1:
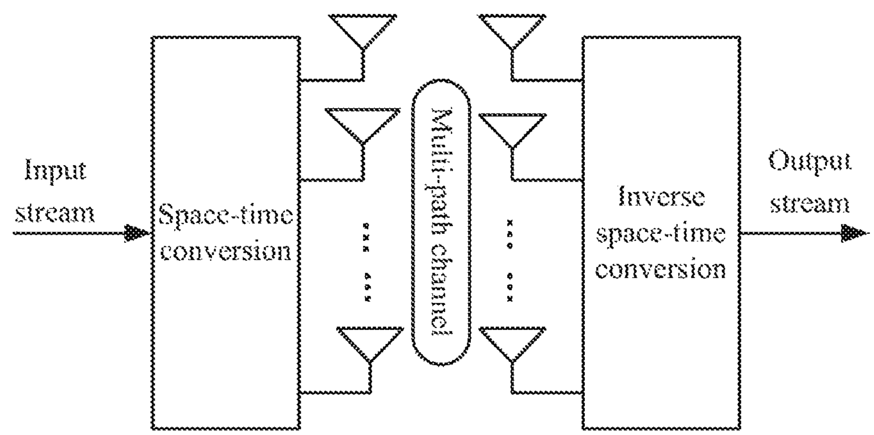
FIG. 1 is a schematic structural diagram of an MIMO system serving a single user in the existing technology.

The capacity of a system is extended, and the throughput thereof is improved, in an LTE network using the MIMO technology. FIG. 1 illustrates a structural block diagram of an MIMO system serving a single user, for example, where both a transmitter (e.g., a base station) and a receiver (e.g., a terminal) are provided with multiple antennas. At the transmitter, an input serial code stream is converted into several parallel separate code sub-streams through a series of preprocessing (e.g., modulation, encoding, weighting, mapping, etc.), and the code sub-streams are transmitted out through different transmit antennas. At the receiver, multiple branches of signals are received using a group of antennas, the number of which is no less than the number of transmit antennas, and processed in the space domain and the time domain according to some estimated coding relationship between a channel transmission characteristic and a transmitted code sub-stream, so that the signals are separated into several transmitted code sub-streams, and the code sub-streams are further converted into serial data, which are output.

However as the capacity is extended, interference also becomes higher accordingly due to the correlation between channels in a channel matrix, and in order to alleviate the complexity of implementing the terminal from being affected by the interference between the channels, and also lower an overhead of the system, and improve the capacity of the MIMO system as many as possible, pre-coding has been introduced in the existing technology.

Close-loop pre-coding has been introduced to the LTE Rel-8 system so as to improve the spectrum efficiency. The same pre-coding matrix set, which is referred to as a codebook, is stored in the base station and the terminal as required for close-loop pre-coding. After the terminal estimates channel information using a cell-common pilot, it selects a pre-coding matrix from the codebook as per some criterion, and feeds the index of the pre-coding matrix in the codebook back to the base station over an uplink channel, where the index is denoted as a Pre-coding Matrix Indicator (PMI). The base station determines the pre-coding matrix used for the terminal according to the received PMI. The terminal further reports a corresponding RI and CQI together with the PMI, so that the base station determines the number of codewords, and the number of transmission layers for downlink transmission, and modulating and coding schemes for the respective codewords.

As the LTE network is further evolving, more antenna ports (e.g., eight antennas) are supported in the LTE network, and in order to make better use of the technical advantage of MIMO, the structure of a pilot has been modified accordingly. A downlink pilot is categorized into a Demodulation Reference Signal (DMRS) and a CSI-RS respectively for demodulation and channel measurement, where the CSI-RS is used for channel estimation in the downlink channel, and to guide the selection of a pre-coding matrix, and the terminal can only generate and report a CQI, a PMI, an RI, etc., according to a measured CSI-RS.

Figure 2:
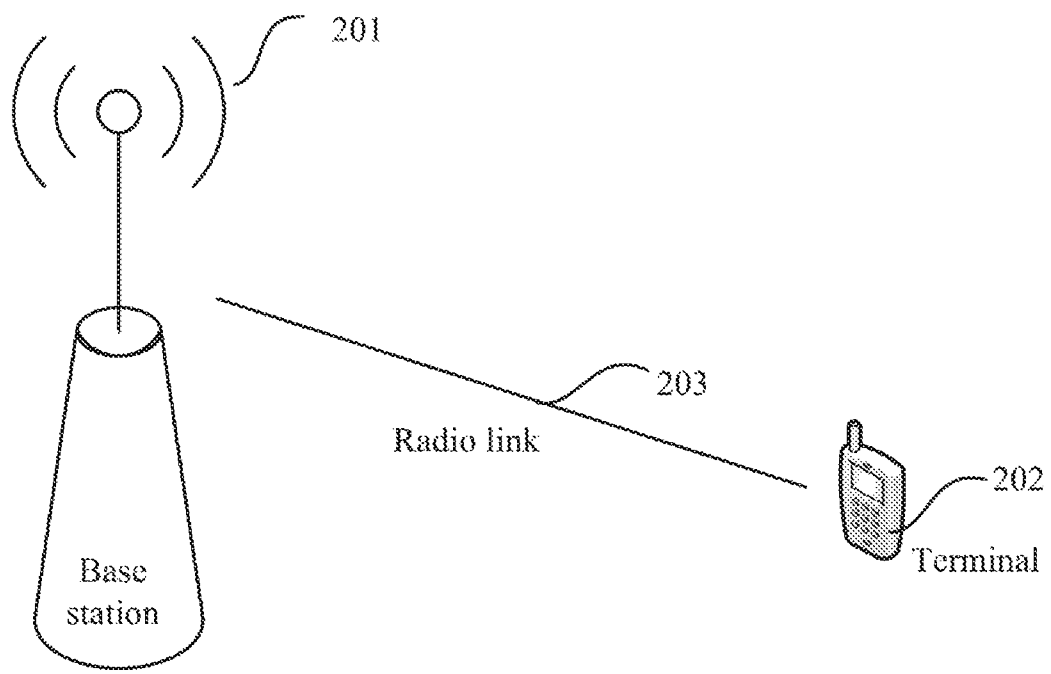
FIG. 2 is a schematic structural diagram of transmission in a CSI-RS measuring mechanism in the existing technology.

FIG. 2 illustrates a structural diagram of a wireless network operating in a CSI-RS measuring mechanism in the existing technology, where the network includes a base station 201, a terminal 202, and a radio link 203. Both the terminal 202 and the base station 201 are provided with multiple antennas. The terminal 202 measures CSI according to a CSI-RS transmitted by the base station 201, and feeds the measured CSI back to the base station 201 over the radio link 203, where the CSI can include one or more CQIs indicating the quality of a wireless communication channel between the base station and the terminal, a PMI indicating a preferable pre-coding matrix for shaping a signal to be transmitted, an RI indicating the number of useful transmission layers of a data channel preferred by the terminal, and an estimated channel coefficient. The base station 201 selects a pre-coding matrix and a modulation and coding scheme for transmitting downlink data, according to the CSI fed back by the terminal 202, and with the CSI fed back by the terminal 202, the base station 201 can configure an appropriate transmission scheme adaptively to improve a coverage area, or a transmission rate of user data, or to predicate a channel quality more precisely for further transmission to the base station 202.

Due to a serious delay in providing feedback of CSI in the existing MIMO feedback mechanism, the CSI fed back by the terminal cannot match with the current channel, thus greatly degrading the performance, and failing to guarantee the efficiency of transmission, and this problem may be prominent in a scenario of mobility at a high speed. Accordingly it is highly desirable in the industry to improve the extent of matching the CSI fed back by the terminal with a real channel state.

In order to improve the extent of matching CSI fed back by a terminal with a channel state, the embodiments of the disclosure propose a solution to providing feedback of CSI. This solution can be applicable to a scenario of downlink MIMO transmission. In the embodiments of the disclosure, a terminal measuring CSI selects one or more CSI-RS resources or one or more CSI-RS ports in a prescribed sub-band from a CSI-RS resource set configured by a base station, that is, the terminal selects a beam-forming vector (or a group of beam-forming vectors), measures one or more CQIs by using a plurality of pre-coding matrixes in a pre-coding matrix set corresponding to the one or more selected CSI-RS resources or CSI-RS ports as pre-coding matrixes over different physical resources in the sub-band, and provides feedback of the one or more measured CQIs, and feedback of indication information of the one or more selected CSI-RS resources or CSI-RS ports, thus improving the extent of matching the CSI with a channel state.

The embodiments of the disclosure will be described below in details with reference to the drawings.

Figure 3:
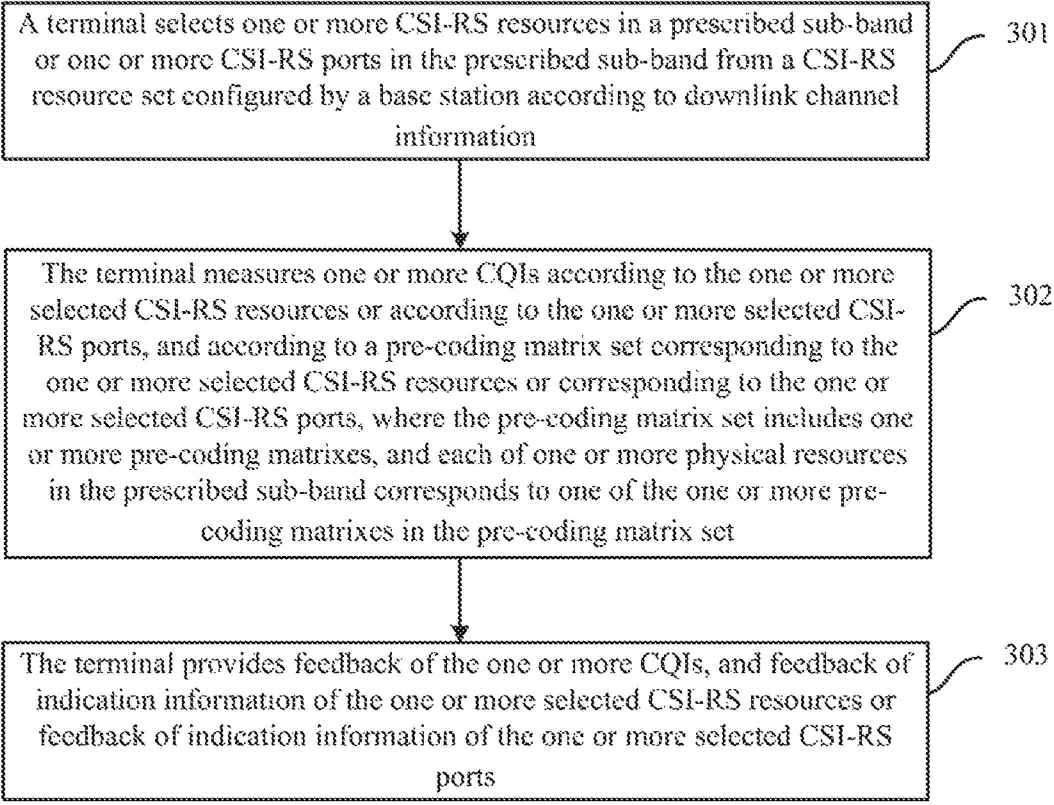
FIG. 3 is a schematic flow chart of providing feedback of CSI according to an embodiment of the disclosure.

In order to make the flow as illustrated in FIG. 3 more apparent, some technical terms in the flow as illustrated in FIG. 3 will be firstly described below.

A sub-band is a granularity unit, in the frequency domain, at which channel information is fed back at a physical layer in an LTE system. A system bandwidth can be divided into several sub-bands, and for example, the size of a sub-band may be 4, 6, 8, or more PRBs dependent upon the different system bandwidth.

A prescribed sub-band is a sub-band with a prescribed bandwidth size. In the embodiments of the disclosure, the prescribed sub-band can include PRBs, or the width of the prescribed sub-band can be the system bandwidth. The size of the bandwidth can be agreed on in advance between the terminal and the base station.

A CSI-RS resource represents a full set of CSI-RS resource configuration parameters, e.g., the number of CSI-RS ports, a periodicity, a start position, a type of pilot structure, an intra-sub-frame position identifier, and etc. The base station beam-forms a CSI-RS signal and then transmits the CSI-RS signal to the terminal over a configured CSI-RS resource, where different CSI-RS resources can be beam-formed using different beam-forming weights.

A CSI-RS resource can be configured with a plurality of CSI-RS ports, and for example, the number of CSI-RS ports in a CSI-RS resource can be 2, 4, 8, etc. The base station beam-forms and then transmits a CSI-RS signal to the terminal over a configured CSI-RS resource, where different CSI-RS ports can be beam-formed using different beam-forming weights.

A plurality of CSI-RS ports configured for a CSI-RS resource are grouped into groups of CSI-RS ports in a grouping scheme, and a group of CSI-RS ports include at least one CSI-RS port. In the embodiments, the grouping scheme can be notified by the base station to the terminal, or agreed on in advance between the base station and the terminal. The base station beam-forms and then transmits a CSI-RS signal to the terminal over a configured CSI-RS resource, where different groups of CSI-RS ports can be beam-formed using different beam-forming weights, and different CSI-RS ports in the same group of CSI-RS ports can be beam-formed using different beam-forming weights.

For example, the terminal groups N CSI-RS ports configured in a CSI-RS resource into N/2 groups in a prescribed grouping scheme, so that each group includes two CSI-RS ports, where the indexes of CSI-RS ports in the i-th group of CSI-RS ports range from i to i+N/2.

A physical resource is defined as follows: in the embodiments of the disclosure, different physical resources can be different time resources, or can be different frequency resources, or can be different combinations of time and frequency resources. In an implementation, a physical resource in a preset bandwidth size can be an RE, a sub-carrier, a PRB, or a set of PRBs, or can be an RE, a sub-carrier, a RPB, or a set of PRBs for transmitting a data symbol.

FIG. 3 illustrates a schematic flow chart of a method for providing feedback of CSI according to an embodiment of the disclosure, and the flow can be performed by a terminal.

As illustrated in FIG. 3, the flow includes the following operations 301-303.

In the operation 301, a terminal selects one or more CSI-RS resources in a prescribed sub-band or one or more CSI-RS ports in the prescribed sub-band from a CSI-RS resource set configured by a base station according to downlink channel information.

The base station firstly transmits information about one or more configured CSI-RS resources to the terminal. In an implementation, the base station beam-forms one or more CSI-RS signals and then transmits the one or more CSI-RS signals to the terminal over the one or more configured CSI-RS resources. Different CSI-RS resources, different ports in a CSI-RS resource, different groups of ports in a CSI-RS resource, or different groups of ports in different CSI-RS resources can be beam-formed using different beam-forming weights.

For example, the CSI-RS resource set configured by the base station includes four CSI-RS resources, and the respective CSI-RS resources are beam-formed using different beam-forming weights, so that the terminal selects one or more CSI-RS resources from the CSI-RS resource set configured by the base station in the operation 301, that is, the terminal selects one or more beams.

In another example, the CSI-RS resource set configured by the base station includes a CSI-RS resource configured with eight CSI-RS ports, and the respective CSI-RS ports in the CSI-RS resource are beam-formed using different beam-forming weights, so that the terminal selects one or more CSI-RS ports from the CSI-RS resource configured by the base station in the operation 301, that is, the terminal selects one or more beams.

In another example, the CSI-RS resource set configured by the base station includes a CSI-RS resource configured with eight CSI-RS ports, the eight CSI-RS ports in the CSI-RS resource are grouped into four groups of CSI-RS ports, and the respective groups of CSI-RS ports in the CSI-RS resource are beam-formed using different beam-forming weights, so that the terminal selects a group of CSI-RS ports (i.e., a plurality of CSI-RS ports) in the operation 301, that is, the terminal selects a beam.

In another example, the CSI-RS resource set configured by the base station includes four CSI-RS resources configured with eight CSI-RS ports, the CSI-RS ports in each CSI-RS resource are grouped into four groups of CSI-RS ports, the respective CSI-RS resources are beam-formed using different beam-forming weights, and the respective groups of CSI-RS ports in each CSI-RS resource are also beam-formed using different beam-forming weights, that is, the sixteen groups of CSI-RS ports are beam-formed using sixteen different beam-forming weights, so that the terminal selects a CSI-RS resource, and a group of CSI-RS ports (i.e., a plurality of CSI-RS ports) in the operation 301, that is, the terminal selects a beam.

Here a beam-formed CSI-RS port can be mapped onto a part of antenna elements, or can be mapped onto all the antenna elements. For example, a CSI-RS port in a group of CSI-RS ports including two CSI-RS ports is mapped onto all the antenna elements corresponding to a polarization direction, and the other CSI-RS port is mapped onto all the antenna elements corresponding to the other polarization direction.

Figure 4:
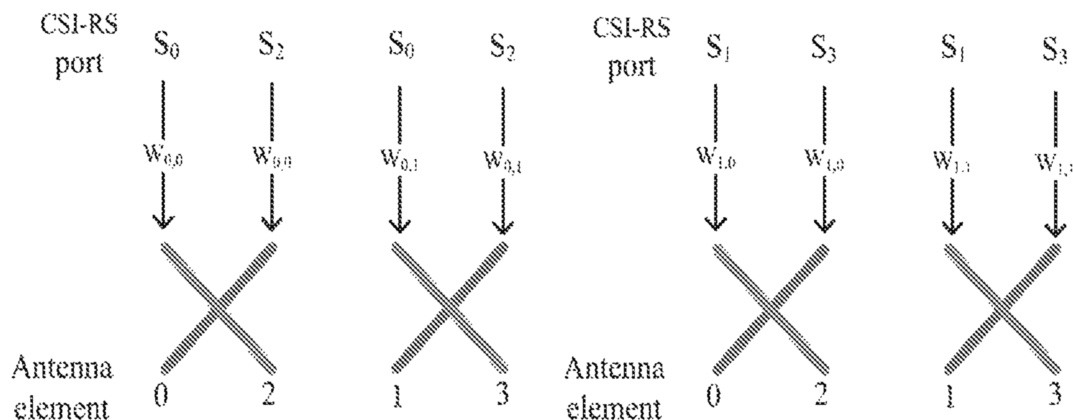
FIG. 4 is an example of a mapping relationship between CSI-RS ports and antenna elements according to an embodiment of the disclosure.

By way of an example, if the base station is configured with four antennas, and a CSI-RS resource includes four CSI-RS ports, then these CSI-RS ports may be grouped into two groups, the CSI-RS ports in these two groups of CSI-RS ports may be {0,2} and {1,3} respectively, and a mapping relationship between CSI-RS ports and antenna elements may be as illustrated in FIG. 4, where a beam-forming matrix $W_{i,j}$ represents a beam-forming weight for a CSI-RS port in the i-th group of CSI-RS ports, on the j-th antenna element in a polarization direction of the CSI-RS port. After each CSI-RS port is beam-formed, a CSI-RS signal is transmitted over a physical resource of the respective port.

The terminal can obtain the downlink channel information according to one or more CSI-RS signals transmitted by the base station, so that the terminal can select the one or more CSI-RS resources or the one or more CSI-RS ports in the prescribed sub-band from the CSI-RS resource set configured by the base station according to the downlink channel information.

Furthermore the terminal can select the one or more CSI-RS resources or the one or more CSI-RS ports in the prescribed sub-band from the CSI-RS resource set configured by the base station based upon a predetermined RI and the downlink channel information.

Here the terminal can determine the number of the one or more CSI-RS resources or one or more CSI-RS ports to be selected, according to the predetermined RI. In some embodiment of the disclosure, the RI above can be an RI lastly fed back by the terminal or indicated by the base station to the terminal.

In an implementation, the terminal can select the one or more CSI-RS resources or the one or more CSI-RS ports in the operation 301 in the following several instances dependent upon different instances of the CSI-RS resource set configured by the base station.

In a first instance, the CSI-RS resource set configured by the base station includes a plurality of CSI-RS resources, so the terminal selects one or more CSI-RS resources in the prescribed sub-band from the CSI-RS resource set configured by the base station (that is, the terminal selects one or more CSI-RS resources from all the CSI-RS resources).

In a second instance, the set of CSI-RS resources configured by the base station includes a CSI-RS resource configured with a plurality of ports, so the terminal selects one or more CSI-RS ports in the prescribed sub-band from the CSI-RS resource set configured by the base station (i.e., the CSI-RS resource configured with the plurality of ports), that is, the terminal selects one or more CSI-RS ports from all the CSI-RS ports.

In a third instance, the CSI-RS resource set configured by the base station includes a CSI-RS resource configured with a plurality of ports, and these ports are grouped in a grouping scheme, so the terminal selects one or more groups of CSI-RS ports in the prescribed sub-band from the CSI-RS resource set configured by the base station (i.e., the CSI-RS resource configured with the plurality of ports), that is, the terminal selects a plurality of CSI-RS ports in the prescribed sub-band from all the CSI-RS ports.

In a fourth instance, the CSI-RS resource set configured by the base station includes a plurality of CSI-RS resources configured with a plurality of ports, and the ports in each CSI-RS resource are grouped in a grouping scheme, so the terminal selects one or more CSI-RS resources, and one or more groups of CSI-RS ports in each CSI-RS resource, in the prescribed sub-band from the CSI-RS resource set configured by the base station (i.e., the plurality of CSI-RS resource configured with the plurality of ports), that is, the terminal selects a plurality of CSI-RS ports in the prescribed sub-band from all the CSI-RS ports.

As can be appreciated from the description of the four instances above, the terminal can select the one or more CSI-RS resources or the one or more CSI-RS ports in the prescribed sub-band from the CSI-RS resource set configured by the base station dependent upon the different instances of the CSI-RS resource set configured by the base station particularly in the following two instances: the terminal selects one or more CSI-RS resources in the prescribed sub-band from all the CSI-RS resources in the CSI-RS resource set configured by the base station, or the terminal selects one or more CSI-RS ports in the prescribed sub-band from all the CSI-RS ports in the CSI-RS resource set configured by the base station.

A process in which the terminal selects one or more CSI-RS resources in the prescribed sub-band from the CSI-RS resource set configured by the base station, and a process in which the terminal selects one or more CSI-RS ports from all the CSI-RS ports in the CSI-RS resource set configured by the base station will be described below respectively taking the first instance and the second instance above as an example.

In the first instance (in which the CSI-RS resource set configured by the base station includes a plurality of CSI-RS resources, and the terminal selects one or more of the CSI-RS resources), the terminal can select a CSI-RS resource in the prescribed sub-band from the CSI-RS resource set configured by the base station according to the downlink channel information as follows.

The terminal determines transmission performance information corresponding to the CSI-RS resources configured by the base station according to the downlink channel information corresponding to the CSI-RS resources in the CSI-RS resource set configured by the base station, and further selects a CSI-RS resource in the prescribed sub-band from the CSI-RS resource set configured by the base station according to the determined transmission performance information corresponding to the CSI-RS resources.

Or, the terminal determines transmission performance information corresponding to the CSI-RS resources configured by the base station according to results calculated from a pre-coding matrix set, and according to the downlink channel information, corresponding to the CSI-RS resources in the CSI-RS resource set configured by the base station, and further selects a CSI-RS resource in the prescribed sub-band from the CSI-RS resource set configured by the base station according to the determined transmission performance information corresponding to the CSI-RS resources.

Here the pre-coding matrix set corresponding to the CSI-RS resources can be agreed on in advance between the terminal and the base station.

In an implementation, the terminal and the base station can be preconfigured with the same codebook including a plurality of sets of pre-coding matrixes, where the terminal can determine a corresponding pre-coding matrix set according to the number of CSI-RS ports in each selected CSI-RS resource, or the total number of CSI-RS ports in all the selected CSI-RS resources, and the assumed current number of transmission layers (Rank). For example, the number of rows in a pre-coding matrix in the pre-coding matrix set is equal to the number of CSI-RS ports in each selected CSI-RS resource, or the total number of CSI-RS ports in all the selected CSI-RS resources; and the number of columns in the pre-coding matrix is equal to the assumed current number of transmission layers (Rank).

For example, an example of a pre-coding matrix set corresponding to CSI-RS resources is as follows.

A pre-coding matrix set at Rank=1 can be:

$$W_1=\begin{bmatrix}1\\1\end{bmatrix}\ W_2=\begin{bmatrix}1\\-1\end{bmatrix}\ W_3=\begin{bmatrix}1\\j\end{bmatrix}\ W_4=\begin{bmatrix}1\\-j\end{bmatrix}.$$

A pre-coding matrix set at Rank=2 can be:

$$W_1=\begin{bmatrix}1&1\\1&-1\end{bmatrix}\ W_2=\begin{bmatrix}1&1\\-1&1\end{bmatrix}\ W_3=\begin{bmatrix}1&1\\j&-j\end{bmatrix}\ W_4=\begin{bmatrix}1&1\\-j&j\end{bmatrix},\text{ or}$$

$$W_1=\begin{bmatrix}1&1\\1&-1\\0&0\\0&0\end{bmatrix}\ W_2=\begin{bmatrix}1&1\\-1&1\\0&0\\0&0\end{bmatrix}\ W_3=\begin{bmatrix}0&0\\0&0\\1&1\\1&-1\end{bmatrix}\ W_4=\begin{bmatrix}0&0\\0&0\\1&1\\-1&1\end{bmatrix},\text{ or}$$

-continued $$W_1=\begin{bmatrix}1&1\\1&-1\\1&1\\1&-1\end{bmatrix}\ W_2=\begin{bmatrix}1&1\\-1&1\\1&1\\-1&1\end{bmatrix}\ W_3=\begin{bmatrix}1&1\\1&-1\\1&1\\-1&1\end{bmatrix}\ W_4=\begin{bmatrix}1&1\\-1&1\\1&1\\1&-1\end{bmatrix}.$$

A pre-coding matrix set at Rank=3 can be:

$$W_1=\begin{bmatrix}1&1&0\\1&-1&0\\0&0&1\\0&0&1\end{bmatrix}\ W_2=\begin{bmatrix}1&1&0\\-1&1&0\\0&0&1\\0&0&-1\end{bmatrix}$$

$$W_3=\begin{bmatrix}0&0&1\\0&0&1\\1&1&0\\1&-1&0\end{bmatrix}\ W_4=\begin{bmatrix}0&0&1\\0&0&-1\\1&1&0\\-1&1&0\end{bmatrix},\text{ or}$$

$$W_1=\begin{bmatrix}1&1&1\\1&1&-1\\1&-1&1\\-1&1&1\end{bmatrix}\ W_2=\begin{bmatrix}1&1&-1\\1&1&1\\-1&1&1\\1&-1&1\end{bmatrix}$$

$$W_3=\begin{bmatrix}1&-1&1\\-1&1&1\\1&1&1\\1&1&-1\end{bmatrix}\ W_4=\begin{bmatrix}1&-1&-1\\-1&1&-1\\-1&-1&1\\-1&-1&-1\end{bmatrix}.$$

A pre-coding matrix set at Rank=4 can be:

$$W_1=\begin{bmatrix}1&1&0&0\\1&-1&0&0\\0&0&1&1\\0&0&1&-1\end{bmatrix}\ W_2=\begin{bmatrix}1&1&0&0\\-1&1&0&0\\0&0&1&1\\0&0&-1&1\end{bmatrix}$$

$$W_3=\begin{bmatrix}0&0&1&1\\0&0&1&-1\\1&1&0&0\\1&-1&0&0\end{bmatrix}\ W_4=\begin{bmatrix}0&0&1&1\\0&0&-1&1\\1&1&0&0\\-1&1&0&0\end{bmatrix},\text{ or}$$

$$W_1=\begin{bmatrix}1&1&1&-1\\1&1&-1&1\\1&-1&1&1\\-1&1&1&1\end{bmatrix}\ W_2=\begin{bmatrix}1&1&-1&1\\1&1&1&-1\\-1&1&1&1\\1&-1&1&1\end{bmatrix}$$

$$W_3=\begin{bmatrix}1&-1&1&1\\-1&1&1&1\\1&1&1&-1\\1&1&-1&1\end{bmatrix}\ W_4=\begin{bmatrix}1&-1&-1&-1\\-1&1&-1&-1\\-1&-1&1&-1\\-1&-1&-1&1\end{bmatrix}.$$

In some embodiments of the disclosure, the terminal can determine the number of CSI-RS resources to be selected, based upon a predetermined RI.

For example, the number of CSI-RS resources to be selected can be determined under any one of the following rules: the number of CSI-RS resources to be selected is equal to the number of downlink transmission layers. Rank, indicated by the RI, the sum of ranks obtained by measuring CSI over the respective selected CSI-RS resources is equal to the Rank indicted by the RI, a rank assumed when CSI is measured after downlink channel information corresponding to the selected CSI-RS resources is combined is equal to the Rank indicated by the RI, etc.

In the second instance (the CSI-RS resource set configured by the base station includes a CSI-RS resource configured with a plurality of CSI-RS ports, and the terminal selects one or more CSI-RS ports from all the CSI-RS ports), the terminal can select a CSI-RS port in the prescribed sub-band from the CSI-RS resource set configured by the base station according to the downlink channel information as follows.

The terminal determines transmission performance information corresponding to the CSI-RS resources configured by the base station according to the downlink channel information corresponding to the CSI-RS resources in the CSI-RS resource set configured by the base station, and further selects a CSI-RS port in the prescribed sub-band from the CSI-RS resource set configured by the base station according to the determined transmission performance information corresponding to the CSI-RS resources.

Or, the terminal determines transmission performance information corresponding to the CSI-RS resources configured by the base station according to results calculated from a pre-coding matrix set, and the downlink channel information, corresponding to the CSI-RS resources in the CSI-RS resource set configured by the base station, and further selects a CSI-RS port in the prescribed sub-band from the CSI-RS resource set configured by the base station according to the determined transmission performance information corresponding to the CSI-RS resources.

Here the pre-coding matrix set corresponding to the CSI-RS resources can be agreed on in advance between the terminal and the base station.

In an implementation, the terminal and the base station can be preconfigured with the same codebook including a plurality of sets of pre-coding matrixes, where the terminal can determine a corresponding pre-coding matrix set according to the number of CSI-RS ports to be selected CSI-RS resource, and the assumed current number of transmission layers (Rank).

In an implementation, the predefined codebook can also be generated by the terminal under a predefined rule as follows.

Pre-coding matrixes in a pre-coding matrix set corresponding to CSI-RS ports can consist of a column selection vector $e_i$ or a column selection vector group $\{e_i\}$, where the column selection vector $e_i$ is a vector with the i-th element being 1, and all the other elements being 0.

In an implementation, a column vector in a pre-coding matrix in a pre-coding matrix set corresponding to M CSI-RS ports can consist of M concatenated column selection vectors $\{e_i\}$ (a column selection vector at M=1, or a column selection vector group at M>1), where an element with the value of 1 in the column selection vector $e_i$ corresponds to a CSI-RS port, the position, of the element with the value of 1, in the column selection vector $e_i$ represents the identifier of the CSI-RS port. CSI-RS ports corresponding to the elements with the value of 1 in the M column selection vectors constitute a group of CSI-RS ports, and M is an integer more than or equal to 1.

The number of CSI-RS ports in a group of CSI-RS ports is equal to the number of column selection vectors in a column vector in a pre-coding matrix corresponding to the group of CSI-RS ports. CSI-RS ports corresponding to elements with the value of 1 in respective column selection vectors in a pre-coding matrix set constitute CSI-RS ports (CSI-RS ports) corresponding to the pre-coding matrix set, so a CSI-RS port(s) can be selected by pre-coding using a pre-coding matrix generated from a column selection vector or a column selection vector group corresponding to the CSI-RS port(s) to be selected.

For example, the length of the column selection vector group $\{e_i\}$ is assumed to be M, where i=0, 1, 2, . . . , M−1:

$$e_0 = \begin{bmatrix} 1 \\ 0 \\ \vdots \\ 0 \end{bmatrix}, e_1 = \begin{bmatrix} 0 \\ 1 \\ \vdots \\ 0 \end{bmatrix} \ldots e_{M-1} = \begin{bmatrix} 0 \\ 0 \\ \vdots \\ 1 \end{bmatrix}.$$

A pre-coding matrix is consisted directly of the column selection vector group $\{e_i\}$:

$$W = \beta \begin{bmatrix} e_{k_1} & e_{k_3} & \ldots & e_{k_{2r-1}} \\ e_{k_2} & e_{k_4} & \ldots & e_{k_{2r}} \end{bmatrix},$$

where β is a constant (a power factor).

In an implementation, pre-coding matrixes in a pre-coding matrix set corresponding to CSI-RS ports can alternatively be obtained from the column selection vector $e_i$ and a phase set $\{\phi_n\}$, or the column selection vector group $\{e_i\}$ and a phase set $\{\phi_n\}$.

Here the phase set $\{\phi_n\}$ includes phase factors $\phi_n$, and a pre-coding matrix in a pre-coding matrix set is obtained based upon a phase factor $\phi_n$. Different pre-coding matrixes in a pre-coding matrix set can be obtained based upon a column selection vector $e_i$ or a column selection vector group $\{e_i\}$, and the different phase factors in the phase set.

In some preferable embodiment of the disclosure, the phase set can be agreed on in advance between the terminal and the base station. A preferable phase set can be $\{\phi_n = e^{jn\pi/2}\}$ or $\{\phi_n = e^{jn\pi}\}$, where n is a non-negative integer less than N, and N is the size of the set.

For example, $$W = \beta \begin{bmatrix} e_{k_1} & e_{k_3} & \ldots & e_{k_{2r-1}} \\ \alpha_1 e_{k_2} & \alpha_2 e_{k_4} & \ldots & \alpha_r e_{k_{2r}} \end{bmatrix} \text{ or}$$

$$W = \beta \begin{bmatrix} e_{k_1} & e_{k_5} & \ldots & e_{k_{4r-3}} \\ \alpha_1 e_{k_2} & \alpha_2 e_{k_6} & \ldots & \alpha_r e_{k_{4r-2}} \\ \delta_1 e_{k_3} & \delta_2 e_{k_7} & \ldots & \delta_r e_{k_{4r-1}} \\ \gamma_1 e_{k_4} & \gamma_2 e_{k_8} & \ldots & \gamma_r e_{k_{4r}} \end{bmatrix},$$

where β is a constant (a power factor), and $\alpha_i$, $\delta_i$, and $\gamma_i$ are phase factors in the phase set $\{\phi_n\}$.

Furthermore a Kronecker product operation can be performed on a phase matrix based upon a phase factor $\phi_n$, and the column selection vector $e_i$, or the column selection vector $e_i$ in the column selection vector group $\{e_i\}$, and a pre-coding matrix is consisted of column vectors in a matrix obtained as a result of the operation.

Here the phase matrix can be $$w_n = \begin{bmatrix} 1 & 1 \\ \phi_n & -\phi_n \end{bmatrix} \text{ or } w_n = \begin{bmatrix} 1 \\ \phi_n \end{bmatrix} \text{ or } w_n = \begin{bmatrix} 1 \\ -\phi_n \end{bmatrix}.$$

For example, the pre-coding matrix is consisted of the Kronecker product of the phase matrix $$w_n = \begin{bmatrix} 1 & 1 \\ \phi_n & -\phi_n \end{bmatrix},$$

and the column selection vector $e_i$, that is, the pre-coding matrix in the pre-coding matrix set is determined as the following matrix, or selected L columns in the following matrix, where L is the currently assumed rank:

$W_n=\beta[w_n \otimes e_{k_1}\ w_n \otimes e_{k_2}\ \ldots\ w_n \otimes e_{k_m}]$, where the phase matrix is $$w_n = \begin{bmatrix} 1 & 1 \\ \phi_n & -\phi_n \end{bmatrix},$$

the column selection vector is $e_i$, the phase factor can be $\phi_n=e^{jn\pi/2}$ or $\phi_n=e^{jn\pi/2}$, where n=0, 1, . . . , K.

Furthermore in some embodiment of the disclosure, if the base station further configures the terminal with a grouping scheme of CSI-RS ports, for example, the base station notifies it to the terminal via higher-layer signaling, the base station and the terminal agreed on it in advance, etc., then the terminal may group the CSI-RS ports in the CSI-RS resources configured by the base station, and further select a CSI-RS port according to a result of grouping, where in an implementation, a group of CSI-RS ports is defined as a unit, and CSI-RS ports are selected in the same way as CSI-RS ports are selected as described above; and in an implementation, a plurality of CSI-RS ports are selected as described above, and for example, a pre-coding matrix set corresponding to groups of CSI-RS ports is consisted of column selection vector groups, where each column selection vector in a column selection vector group corresponds to a CSI-RS port in a group of CSI-RS ports.

For example, the terminal groups N CSI-RS ports in the CSI-RS resources configured by the base station into N/2 groups in the grouping scheme, so that each group includes two CSI-RS ports, where the indexes of CSI-RS ports in the i-th group of CSI-RS ports range from i to i+N/2. The terminal can select a group of CSI-RS ports in the same way as CSI-RS ports are selected as described above. If the base station operates with an array of dually polarized antennas, then each group of polarized antennas will correspond to a port in a group of CSI-RS ports here, different groups of ports may be beam-formed using different beams, and ports in a group of ports may be beam-formed using the same beam.

In some particular embodiment of the disclosure, the terminal can select a CSI-RS resource or a CSI-RS port based upon a grouping scheme configured by the base station, or an RI configured by the base station. For example, when the RI is 1 or 2, each group of CSI-RS ports includes two CSI-RS ports in the grouping scheme in the example above; when the RI is 3 or 4, the CSI-RS ports are grouped into N/4 groups so that each group includes four CSI-RS ports, and the terminal can make feedback at Rank=3 or 4 based upon a group of CSI-RS ports after selecting the group of CSI-RS ports; and when the RI is more than 4, the CSI-RS ports are grouped into N/8 groups so that each group includes eight CSI-RS ports, and the terminal can transmit at Rank>4 based upon a group of CSI-RS ports.

Here a particular process can be similar to the process above of selecting a CSI-RS port, and for example, the terminal can select a group of CSI-RS ports based upon a predetermined RI, so the predefined codebook to be used can be determined by the RI. In an implementation, the number K of ports in a group of CSI-RS ports is determined by the rank corresponding to the RI, where k is more than the rank corresponding to the RI. If each column vector in a pre-coding matrix, in a pre-coding matrix set corresponding to a group of CSI-RS ports (i.e., a plurality of CSI-RS ports) is consisted of N concatenated column selection vectors $e_i$, then K is equal to N here. For example, a correspondence relationship between K (or N), and a rank corresponding to an RI can be depicted in the table below.

| Rank corresponding to RI | K |
|---|---|
| 1 | 2 |
| 2 | 2 |
| 3 | 4 |
| 4 | 4 |
| 5 | 8 |
| 6 | 8 |
| 7 | 8 |
| 8 | 8 |

For example, when the rank corresponding to the RI is 2, a pre-coding matrix in a pre-coding matrix set corresponding to a group of CSI-RS ports (a plurality of CSI-RS ports) is represented in the form of (a column vector in the pre-coding matrix is consisted of two column selection vectors):

$$W_{m,n}^{(2)} = \frac{1}{2}\begin{bmatrix} e_m & e_m \\ \phi_n e_m & -\phi_n e_m \end{bmatrix}.$$

In another example, when the rank corresponding to the RI is 4, a pre-coding matrix in a pre-coding matrix set corresponding to a group of CSI-RS ports (a plurality of CSI-RS ports) is represented in the form of (a column vector in the pre-coding matrix is consisted of four column selection vectors):

$$W_{m,n}^{(4)} = \frac{1}{4}\begin{bmatrix} e_m & e_m & e_m & e_m \\ \phi_{n1} e_m & -\phi_{n1} e_m & \phi_{n1} e_m & \phi_{n1} e_m \\ \phi_{n2} e_m & \phi_{n2} e_m & -\phi_{n2} e_m & \phi_{n2} e_m \\ \phi_{n3} e_m & \phi_{n3} e_m & \phi_{n3} e_m & -\phi_{n3} e_m \end{bmatrix}.$$

Here in the examples above, phase factors for different column selection vectors in the same row may also be different.

Furthermore in the description above of the first instance and the second instance by way of an example, the terminal selects a CSI-RS resource in the prescribed sub-band from the CSI-RS resource set configured by the base station according to the determined transmission performance information corresponding to the CSI-RS resources; or the terminal selects a CSI-RS port in the prescribed sub-band from the CSI-RS resource set configured by the base station according to the determined transmission performance information corresponding to the ports, where the terminal can select a CSI-RS resource or a CSI-RS port according to one or more of the following transmission performance parameters in the transmission performance information without being limited thereto: Reference Signal Received Power (RSRP), a transport block size, a channel capacity, a Signal to Interference plus Noise Ratio (SINR), etc., and for example, the terminal can select several CSI-RS resources or CSI-RS ports with the highest RSRP, where the number of CSI-RS resources or CSI-RS ports to be selected can be determined according to a predetermined RI as described above.

In the operation 302, the terminal measures one or more CQIs according to the one or more selected CSI-RS resources or according to the one or more selected CSI-RS ports, and according to a pre-coding matrix set corresponding to the one or more selected CSI-RS resources or corresponding to the one or more selected CSI-RS ports, where the pre-coding matrix set includes one or more pre-coding matrixes, and each of one or more physical resources in the prescribed sub-band corresponds to one of the one or more pre-coding matrixes in the pre-coding matrix set.

In an implementation, the terminal can measure a CQI according to the selected CSI-RS resource or CSI-RS port, and the pre-coding matrix set corresponding to the selected CSI-RS resource or CSI-RS port as follows: the terminal measures a CQI according to downlink channel information, and a pre-coding matrix corresponding to a physical resource in the prescribed sub-band, where the pre-coding matrix is a pre-coding matrix in the pre-coding matrix set corresponding to the selected CSI-RS resource or the selected CSI-RI port. Stated otherwise, the terminal can assume different pre-coding matrixes in the pre-coding matrix set corresponding to the selected CSI-RS resource or the selected CSI-RI port to be pre-coding matrixes for transmitting a data symbol over different physical resources in the prescribed sub-band, and measure CQIs, in the operation 302.

In an implementation, if the terminal selects one or more CSI-RS resources from the CSI-RS resource set configured by the base station, then the terminal may measure a CQI respectively according to downlink channel information corresponding to each selected CSI-RS resource according to a pre-coding matrix set corresponding to each selected CSI-RS resource, and obtain the CQI corresponding to each CSI-RS resource; or the terminal can combine downlink channel information corresponding to the respective selected CSI-RS resources, measure a CQI for the combined downlink channel information according to the pre-coding matrix set, and obtain a joint CQI corresponding to the plurality of selected CSI-RS resources. For example, the terminal can combine downlink channel information corresponding to N CSI-RS resources configured with K CSI-RS ports into a piece of equivalent downlink channel information corresponding to the N*K CSI-RS ports, and further measure a CQI.

Here the pre-coding matrix set corresponding to the selected CSI-RS resource can be agreed on in advance between the base station and the terminal. For details thereof, reference can be made to the pre-coding matrix set corresponding to the CSI-RS resource in the operation 301 above.

If the terminal selects one or more CSI-RS ports from the CSI-RS resource set configured by the base station, then the terminal may measure a CQI for downlink channel information corresponding to each selected CSI-RS port according to a pre-coding matrix set corresponding to the selected CSI-RS port, and obtain the CQI corresponding to the selected CSI-RS port; or the terminal can measure a CQI according to downlink channel information corresponding to the CSI-RS resources configured by the base station, and a pre-coding matrix set corresponding to the selected CSI-RS port, and obtain the CQI corresponding to the selected CSI-RS port.

Here the pre-coding matrix set corresponding to the selected CSI-RS port can be agreed on in advance between the base station and the terminal, or pre-coding matrixes in the pre-coding matrix set corresponding to the selected CSI-RS port can be consisted of a column selection vector or a column selection vector group, or obtained from a column selection vector (or a column selection vector group) and a phase set, particularly as described for the pre-coding matrix set corresponding to the CSI-RS resources (the predefined codebook) in the operation 301 above.

If the number of physical resources in the prescribed sub-band is more than the number of pre-coding matrixes in the pre-coding matrix set, then the pre-coding matrixes in the pre-coding matrix set may be recycled over the physical resources in the bandwidth.

In an implementation, the terminal can assume that the i-th physical resource in the prescribed sub-band corresponds to the k-th pre-coding matrix in the pre-coding matrix set, where: $k=i \bmod K$, where $i=0, 1, 2 \ldots N$, $k=0, 1, 2, 3, \ldots, K-1$, N is the number of physical resources in the sub-band, and K is the number of pre-coding matrixes in the pre-coding matrix set; or $k=\text{ceil}(i/v) \bmod K$, where ceil(i/v) represents the minimum integer no less than i/v, v=RI, or v is the number of antenna ports, $i=0, 1, 2 \ldots N$, $k=0, 1, 2, 3, \ldots, K-1$, N is the number of physical resources in the sub-band, and K is the number of pre-coding matrixes in the pre-coding matrix set. The pre-coding matrixes in the pre-coding matrix set are recycled over a unit of K physical resources as described above.

If there is only one pre-coding matrix in the pre-coding matrix set, then it may be assumed that there is the same pre-coding matrix for all the physical resources in the prescribed sub-band.

Furthermore the terminal can further measure information in the CSI, e.g., an RI, a PMI, etc., according to the selected CSI-RS resource or CSI-RS port, and the pre-coding matrix set corresponding to the selected CSI-RS resource or CSI-RS port. In an implementation, the information in the CSI fed back by the terminal can be configured by the base station, and for example, the base station can configure the terminal to report only a CQI, or an RI and a CQI. For example, the terminal can select the optimum RI based upon channel capacities, transport block sizes, and other physical quantities corresponding to different RIs, and calculate SINRs over the respective physical resources based upon the assumed optimum RI, and the predefined pre-coding matrix set to thereby map them to corresponding CQIs.

In the operation 303, the terminal provides feedback of the one or more CQIs, and feedback of indication information of the one or more selected CSI-RS resources or feedback of indication information of the one or more selected CSI-RS ports.

Here the indication information of the selected CSI-RS resource is the index of the selected CSI-RS resource in the CSI-RS resource set configured by the base station.

In an implementation, after the terminal selects the CSI-RS resource from the CSI-RS resource set configured by the base station in the operation 301, it feeds the index of the selected CSI-RS resource in the CSI-RS resource set back to the base station as indication information of the selected CSI-RS resource.

For example, there are four CSI-RS resources in the CSI-RS resource set configured by the base station, then the different CSI-RS resources may be indicated respectively using 2 bits of information, so if the terminal selects one of the CSI-RS resources, then the selected CSI-RS resource will be indicated using 2 bits of information, and fed back; and if the terminal selects more than one of the CSI-RS resources, then the terminal may feed back indication information corresponding to the respective selected CSI-RS resources respectively.

In another example, the terminal can alternatively feed back the selected CSI-RS resource using a bitmap, that is, the selected CSI-RS resource can be indicated using a bitmap, and particularly such a bit in the bitmap that corresponds to the selected CSI-RS resource can be 1 while the other bits are 0.

Here the indication information of the selected CSI-RS resource is the index of the selected CSI-RS resource among all the CSI-RS ports in the CSI-RS resources configured by the base station (a first scheme); or the indication information of the selected CSI-RS port is the index, of the pre-coding matrix set corresponding to the selected CSI-RS port, in a predefined codebook (a second pattern).

In an implementation, in the first scheme, after the terminal selects the CSI-RS port from the CSI-RS resource set configured by the base station in the operation 301, it feeds the index of the selected CSI-RS port among all the CSI-RS ports in the CSI-RS resources back to the base station as indication information of the selected CSI-RS port.

For example, there are four CSI-RS ports in the CSI-RS resource set configured by the base station, then the different CSI-RS ports may be indicated respectively using 2 bits of information, so if the terminal selects one of the CSI-RS ports, then the selected CSI-RS port will be indicated using 2 bits of information, and fed back; and if the terminal selects more than one of the CSI-RS ports, then the terminal may feed back indication information corresponding to the respective selected CSI-RS ports respectively.

In another example, the terminal can alternatively feed back the selected CSI-RS port using a bitmap, that is, the selected CSI-RS port can be indicated using a bitmap, and particularly such a bit in the bitmap that corresponds to the selected CSI-RS port can be 1 while the other bits are 0.

In an implementation, in the second scheme, after the terminal selects the CSI-RS port from the CSI-RS resource set configured by the base station in the operation 301, it feeds the index, of the pre-coding matrix set corresponding to the selected CSI-RS port, in the predefined codebook back to the base station as indication information of the selected CSI-RS port, where the predefined codebook can in an implementation, be as described for the pre-coding matrix set corresponding to the CSI-RS port (the predefined codebook) in the operation 301 above.

In order to make the indication information of the selected CSI-RS as described in the second scheme above more apparent, particular examples will be given below.

In a first example, Rank=2, and the CSI-RS resource set configured by the base station includes eight CSI-RS ports, and indication information of a selected CSI-RS port is i1, where the index, of a pre-coding matrix in a pre-coding matrix set indicated by i1, in the set is i2, and a correspondence relationship between i1 and a pre-coding matrix set can be as depicted in Table 1.

TABLE 1

Rank = 2, and the CSI-RS resource set configured by the base station includes eight CSI-RS ports

| | $i_2$ | | | |
|---|---|---|---|---|
| $i_1$ | 0 | 1 | 2 | 3 |
| 0-3 | $W_{i_1,0}^{(2)}$ | $W_{i_1,1}^{(2)}$ | $W_{i_1,2}^{(2)}$ | $W_{i_1,3}^{(2)}$ |

where $W_{m,n}^{(2)} = \frac{1}{2}\begin{bmatrix} e_m & e_m \\ \phi_n e_m & -\phi_n e_m \end{bmatrix}$, $\phi_n = e^{j\pi n/2}$, $e_m$ is a vector with the m-th element being 1, all the other elements being 0, and having a length of 4.

In a second example, Rank=3, and the CSI-RS resource set configured by the base station includes eight CSI-RS ports, and indication information of a selected CSI-RS port is i1, where the index, of a pre-coding matrix in a pre-coding matrix set indicated by i1, in the set is i2, and a correspondence relationship between i1 and a pre-coding matrix set can be as depicted in Table 2, Table 3, or Table 4.

TABLE 2

Rank = 3, and the CSI-RS resource set configured by the base station includes eight CSI-RS ports

| | $i_2$ | | | |
|---|---|---|---|---|
| $i_1$ | 0 | 1 | 2 | 3 |
| 0-3 | $W_{i_1,i_1+1,0}^{(2)}$ | $W_{i_1,i_1+1,1}^{(2)}$ | $W_{i_1,i_1+1,2}^{(2)}$ | $W_{i_1,i_1+1,3}^{(2)}$ |
| 4-7 | $W_{i_1,i_1+2,0}^{(2)}$ | $W_{i_1,i_1+2,1}^{(2)}$ | $W_{i_1,i_1+2,2}^{(2)}$ | $W_{i_1,i_1+2,3}^{(2)}$ |
| 8-11 | $W_{i_1,i_1+3,0}^{(2)}$ | $W_{i_1,i_1+3,1}^{(2)}$ | $W_{i_1,i_1+3,2}^{(2)}$ | $W_{i_1,i_1+3,3}^{(2)}$ |

where $W_{m,m',n}^{(3)} = \frac{1}{\sqrt{6}}\begin{bmatrix} e_m & e_m & e_{m'} \\ \phi_n e_m & -\phi_n e_m & \phi_n e_{m'} \end{bmatrix}$, $\phi_n = e^{j\pi n/2}$, $e_m$ is a vector with the (m mod M)-th element being 1, and all the other elements being 0, where M = 4 is the length of the vector.

TABLE 3

Rank = 3, and the CSI-RS resource set configured by the base station includes eight CSI-RS ports

| | $i_2$ | | | |
|---|---|---|---|---|
| $i_1$ | 0 | 1 | 2 | 3 |
| 0-3 | $W_{i_1,i_1+1,0}^{(2)}$ | $W_{i_1,i_1+1,1}^{(2)}$ | $W_{i_1+1,i_1,0}^{(2)}$ | $W_{i_1+1,i_1,1}^{(2)}$ |
| 4-5 | $W_{i_1,i_1+2,0}^{(2)}$ | $W_{i_1,i_1+2,1}^{(2)}$ | $W_{i_1+2,i_1,0}^{(2)}$ | $W_{i_1+2,i_1,1}^{(2)}$ |

where $W_{m,m',n}^{(3)} = \frac{1}{\sqrt{6}}\begin{bmatrix} e_m & e_m & e_{m'} \\ \phi_n e_m & -\phi_n e_m & \phi_n e_{m'} \end{bmatrix}$, $\phi_n = e^{j\pi n}$, $e_m$ is a vector with the (m mod M)-th element being 1, and all the other elements being 0, where M = 4 is the length of the vector.

TABLE 4

| Rank = 3, and the CSI-RS resource set configured by the base station includes eight CSI-RS ports | | |
|---|---|---|
| | $i_2$ | |
| $i_1$ | 0 | 1 |
| 0-1 | $W_{i_1,0}^{(2)}$ | $W_{i_1,1}^{(2)}$ |

where $W_{m,n}^{(2)} = \frac{1}{4}\begin{bmatrix} e_m & e_m & e_m \\ \phi_n e_m & -\phi_n e_m & \phi_n e_m \\ \phi_n e_m & \phi_n e_m & -\phi_n e_m \\ \phi_n e_m & \phi e_m & \phi_n e_m \end{bmatrix}, \phi_n = e^{j\pi n},$ $e_m$ is a vector with the m-th element being 1, and all the other elements being 0, and with a length of 2.

In a third example, Rank=4, and the CSI-RS resource set configured by the base station includes eight CSI-RS ports, and indication information of a selected CSI-RS port is i1, where the index, of a pre-coding matrix in a pre-coding matrix set indicated by i1, in the set is i2, and a correspondence relationship between i1 and a pre-coding matrix set can be as depicted in Table 5, Table 6, or Table 7.

TABLE 5

| Rank = 4, and the CSI-RS resource set configured by the base station includes eight CSI-RS ports | | | | |
|---|---|---|---|---|
| | $i_2$ | | | |
| $i_1$ | 0 | 1 | 2 | 3 |
| 0-3 | $W_{i_1,i_1+1,0}^{(2)}$ | $W_{i_1,i_1+1,1}^{(2)}$ | $W_{i_1,i_1+1,2}^{(2)}$ | $W_{i_1,i_1+1,3}^{(2)}$ |
| 4-7 | $W_{i_1,i_1+2,0}^{(2)}$ | $W_{i_1,i_1+2,1}^{(2)}$ | $W_{i_1,i_1+2,2}^{(2)}$ | $W_{i_1,i_1+2,3}^{(2)}$ |
| 8-11 | $W_{i_1,i_1+3,0}^{(2)}$ | $W_{i_1,i_1+3,1}^{(2)}$ | $W_{i_1,i_1+3,2}^{(2)}$ | $W_{i_1,i_1+3,3}^{(2)}$ |

where $W_{m,m',n}^{(4)} = \frac{1}{\sqrt{8}}\begin{bmatrix} e_m & e_m & e_{m'} & e_{m'} \\ \phi_n e_m & -\phi_n e_m & \phi_n e_{m'} & -\phi_n e_{m'} \end{bmatrix}, \phi_n = e^{j\pi n/2}, e_m$ is a vector with the (m mod M)-th element being 1, and all the other elements being 0, where M = 4 is the length of the vector.

TABLE 6

| Rank = 4, and the CSI-RS resource set configured by the base station includes eight CSI-RS ports | | | | |
|---|---|---|---|---|
| | $i_2$ | | | |
| $i_1$ | 0 | 1 | 2 | 3 |
| 0-3 | $W_{i_1,i_1+1,0}^{(2)}$ | $W_{i_1,i_1+1,1}^{(2)}$ | $W_{i_1+1,i_1,0}^{(2)}$ | $W_{i_1+1,i_1,1}^{(2)}$ |
| 4-5 | $W_{i_1,i_1+2,0}^{(2)}$ | $W_{i_1,i_1+2,1}^{(2)}$ | $W_{i_1+2,i_1,0}^{(2)}$ | $W_{i_1+2,i_1,1}^{(2)}$ |

where $W_{m,m',n}^{(4)} = \frac{1}{\sqrt{8}}\begin{bmatrix} e_m & e_m & e_{m'} & e_{m'} \\ \phi_n e_m & -\phi_n e_m & \phi_n e_{m'} & -\phi_n e_{m'} \end{bmatrix}, \phi_n = e^{j\pi n},$ $e_m$ is a vector with the (m mod M)-th element being 1, and all the other elements being 0, where M = 4 is the length of the vector.

TABLE 7

| Rank = 4, and the CSI-RS resource set configured by the base station includes eight CSI-RS ports | | | | |
|---|---|---|---|---|
| | $i_2$ | | | |
| $i_1$ | 0 | 1 | 2 | 3 |
| 0-1 | $W_{i_1,0}^{(2)}$ | $W_{i_1,1}^{(2)}$ | $W_{i_1,2}^{(2)}$ | $W_{i_1,3}^{(2)}$ |

where $W_{m,n}^{(2)} = \frac{1}{4}\begin{bmatrix} e_m & e_m & e_m & e_m \\ \phi_n e_m & -\phi_n e_m & \phi_n e_m & \phi_n e_m \\ \phi_n e_m & \phi_n e_m & -\phi_n e_m & \phi_n e_m \\ \phi_n e_m & \phi e_m & \phi_n e_m & -\phi_n e_m \end{bmatrix}, \phi_n = e^{j\pi n/2},$ $e_m$ is a vector with the m-th element being 1, and all the other elements being 0, and with a length of 2.

In an implementation, in the operation 303, the terminal can feed back the CQI, an the indication information of the selected CSI-RS resource or CSI-RS port separately, or the terminal can feed back the CQI, and the indication information of the selected CSI-RS resource or CSI-RS port together.

For example, the terminal feeds back the CQI, and the indication information of the selected CSI-RS resource or CSI-RS port non-periodically upon being triggered by the base station by reporting the CQI and the indication information in a sub-frame.

In another example, the terminal can concatenate bits of the CQI, and the indication information of the selected CSI-RS resource or CSI-RS port, or encode the CQI, and the indication information of the selected CSI-RS resource or CSI-RS port jointly, and feed the CQI and the indication information together back to the base station.

In summary, the embodiment of the disclosure provides a solution to providing feedback of CSI. In the embodiment above of the disclosure, the terminal firstly selects the one or more CSI-RS resources in the prescribed sub-band or the one or more CSI-RS ports in the prescribed sub-band from the CSI-RS resource set configured by the base station, and further measures the one or more CQIs by using the one or more pre-coding matrixes in the pre-coding matrix set corresponding to the one or more selected CSI-RS resources or corresponding to the one or more selected CSI-RS ports as one or more pre-coding matrixes over the one or more physical resources in the sub-band, and provides feedback of the one or more measured CQIs, and feedback of the indication information of the one or more selected CSI-RS resources or feedback of indication information of the one or more selected CSI-RS ports. In the embodiment of the disclosure, the terminal measures CQIs using corresponding pre-coding matrixes over different physical resources in the prescribed sub-band based upon the pre-coding matrix set, thus improving the extent of matching the CSI with a channel state over the existing technology in which a CQI is measured based upon only one pre-coding matrix.

Based upon the same technical idea, an embodiment of the disclosure further provides a pre-coding method.

Figure 5:
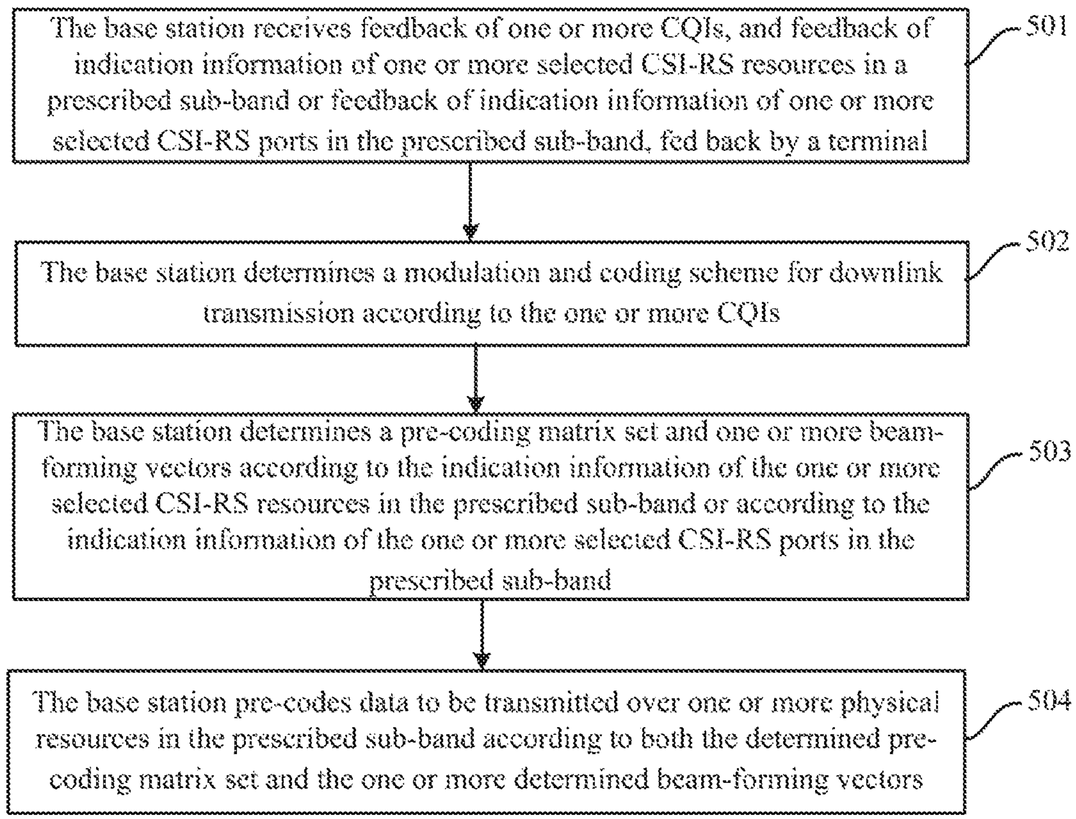
FIG. 5 is a schematic flow chart of pre-coding according to an embodiment of the disclosure.

FIG. 5 illustrates a schematic flow chart of a pre-coding method according to another embodiment of the disclosure, and the flow can be performed by a base station. The flow includes the following operations 501-504.

In the operation 501, the base station receives feedback of one or more CQIs, and feedback of indication information of one or more selected CSI-RS resources in a prescribed sub-band or feedback of indication information of one or more selected CSI-RS ports in the prescribed sub-band, fed back by a terminal.

In the operation 502, the base station determines a modulation and coding scheme for downlink transmission according to the one or more CQIs.

In the operation 503, the base station determines a pre-coding matrix set and one or more beam-forming vectors according to the indication information of the one or more selected CSI-RS resources in the prescribed sub-band or according to the indication information of the one or more selected CSI-RS ports in the prescribed sub-band.

In the operation 504, the base station pre-codes data to be transmitted over one or more physical resources in the prescribed sub-band according to both the determined pre-coding matrix set and the one or more determined beam-forming vectors.

Here the base station can determine the modulation and coding scheme for downlink transmission according to the received one or more CQIs fed back by the terminal.

Here after the base station determines the corresponding pre-coding matrix set and one or more beam-forming vectors according to the indication information of the one or more selected CSI-RS resources in the prescribed sub-band or according to the indication information of the one or more selected CSI-RS ports in the prescribed sub-band, the base station can perform a calculation operation on both one or more pre-coding matrixes in a determined first pre-coding matrix set and the one or more determined beam-forming vectors, and obtain a second pre-coding matrix set for pre-coding, where the second pre-coding matrix set includes one or more pre-coding matrixes, and each physical resource in the prescribed sub-band corresponds to one of the one or more pre-coding matrixes in the second pre-coding matrix set. And the base station can pre-code the data to be transmitted over the one or more physical resources in the prescribed sub-band according to the one or more pre-coding matrixes in the second pre-coding matrix set.

In an implementation, if the indication information of the one or more selected CSI-RS resources in the prescribed sub-band or the indication information of the one or more selected CSI-RS ports in the prescribed sub-band, fed by the terminal, received by the base station in the operation 501 is one or more indexes of the one or more selected CSI-RS resources in a CSI-RS resource set configured by the base station, or is one or more indexes of the one or more selected CSI-RS ports among all CSI-RS ports included by one or more CSI-RS resources configured by the base station, then in the operation 503, the base station determines the corresponding pre-coding matrix set according to the one or more selected CSI-RS resources corresponding to the indication information or according to the one or more selected CSI-RS ports corresponding to the indication information, and determines one or more beam-forming vectors for beam-forming the one or more selected CSI-RS resources or the one or more selected CSI-RS ports as one or more beam-forming vectors for downlink transmission in the prescribed sub-band, and further in the operation 504, the base station obtains the pre-coding matrix set for downlink transmission from the one or more determined beam-forming vectors, and different pre-coding matrixes in the determined pre-coding matrix set, and pre-codes the data to be transmitted over the physical resources in the prescribed sub-band using the pre-coding matrix set.

In an implementation, in the operation 504, the base station performs an operation on both the one or more beam-forming vectors and different pre-coding matrixes in the pre-coding matrix set (which can be referred to as a first pre-coding matrix set in the embodiment of the disclosure for the sake of a convenient description), and determines pre-coding matrixes in a pre-coding matrix set obtained as a result of the calculation operation (which can be referred to as a second pre-coding matrix set) respectively as pre-coding matrixes for transmitting data symbols over different physical resources in the prescribed sub-band, that is, each physical resource in the prescribed sub-band corresponds to one of the pre-coding matrixes in the second pre-coding matrix set; and the base station pre-codes the data to be transmitted over the physical resources in the prescribed sub-band according to the second pre-coding matrix set. This process can be the same as the process of assuming the pre-coding matrixes for data symbols over the different physical resources at the terminal side when measuring a CQI.

In some preferable embodiment of the disclosure, the calculation operation above can be a Kronecker product operation.

In an implementation, the first pre-coding matrix set for obtaining the second pre-coding matrix set for downlink transmission as a result of the operation can be the same as the pre-coding matrix set used by the terminal when measuring a CQI as described in the embodiment of the method above at the terminal side.

For example, if the indication information fed back by the terminal indicates that k CSI-RS resources or CSI-RS ports are selected, and beam-forming vectors for beam-forming the k selected CSI-RS resources or CSI-RS ports are $\{v_1, v_2, \ldots, v_k\}$ respectively, where $v_k$ corresponds to a pre-coding matrix set $\{w_{k,i}, i=1, 2, \ldots, K\}$, then resulting pre-coding matrixes for transmitting data will be $W_i=[w_{1,i}\otimes v_1\ w_{2,i}\otimes v_2 \ldots w_{k,i}\otimes v_k]$, where i=1, 2, . . . , K. The base station determines $W_i$ as a pre-coding matrix over the (n*K+i)-th physical resource in the prescribed sub-band.

Here after the base station determines the corresponding pre-coding matrix set and beam-forming vectors according to the indication information of the selected CSI-RS port in the prescribed sub-band, the base station can replace respective column selection vectors in the pre-coding matrixes in the determined pre-coding matrix set respectively with the beam-form vectors corresponding to the respective column selection vectors, and obtain the second pre-coding matrix set for pre-coding, where a column vector in a pre-coding matrix is consisted of M concatenated column selection vectors, each column selection vector corresponds to a CSI-RS port, the second pre-coding matrix set includes pre-coding matrixes, a physical resource in the prescribed sub-band corresponds to one of the one or more pre-coding matrixes in the second pre-coding matrix set, and M is an integer more than or equal to 1; and the base station further pre-codes the data to be transmitted over the physical resources in the prescribed sub-band according to the pre-coding matrixes in the second pre-coding matrix set, corresponding to the physical resources in the prescribed sub-band.

In an implementation, if the indication information of the selected CSI-RS port in the prescribed sub-band, fed back by the terminal, received by the base station in the operation 501 is the index, of the pre-coding matrix set corresponding to the selected CSI-RS port, in a predefined codebook, then the base station will determine the pre-coding matrix set corresponding to the indication information from the predefined codebook according to the indication information in the operation 503, so the base station can obtain the selected CSI-RS ports and corresponding beam-form vectors according to column selection vectors in the respective pre-coding matrixes in the determined pre-coding matrix set, where a column vector in a pre-coding matrix is consisted of M concatenated column selection vectors, each column selection vector corresponds to a CSI-RS port, and M is an integer more than or equal to 1; and further in the operation 504, the base station can replace the respective column selection vectors in the pre-coding matrixes in the pre-coding matrix set determined in the operation 503 respectively with the beam-form vectors corresponding to the respective column selection vectors, obtain the second pre-coding matrix set for pre-coding, and determine the different pre-coding matrixes in the second pre-coding matrix set respectively as pre-coding matrixes for transmitting data symbols over the different physical resources in the prescribed sub-band. This process can be the same as the process of assuming the pre-coding matrixes for data symbols over the different physical resources at the terminal side in measuring a CQI.

Here the pre-coding matrix set, corresponding to the selected CSI-RS port, for obtaining the second pre-coding matrix set for downlink transmission as a result of the operation can in an implementation, be the same as the pre-coding matrix set, corresponding to the selected CSI-RS port, used by the terminal in measuring a CQI as described in the embodiment of the method above at the terminal side. The predefined codebook can also in an implementation, be the same as the predefined codebook as described in the embodiment of the method above at the terminal side. For example, the pre-coding matrixes in the pre-coding matrix set determined according to the indication information of the CSI-RS port are consisted of a column selection vector or a column selection vector group, where an element in the column selection vector is 1, and all the other elements are 0; or obtained from a column selection vector and a phase set (or a column selection vector group and a phase set), where the phase set includes phase factors, and a pre-coding matrix in a pre-coding matrix set is obtained based upon a phase factor. For example, a column vector in a pre-coding matrix in the pre-coding matrix set determined according to the indication information of the CSI-RS ports is consisted of M concatenated column selection vectors. M is the number of selected CSI-RS ports, ports corresponding to the elements with the value of 1 in the M column selection vectors constitute the selected CSI-RS ports, and M is an integer more than or equal to 1.

For example, if a column selection vector in a pre-coding matrix in the pre-coding matrix set corresponding to the selected CSI-RS ports is $e_k$, which indicates that the k-th CSI-RS resource or CSI-RS port (or group of CSI-RS ports) is selected, and a beam-forming for the k-th CSI-RS resource or CSI-RS port (or group of CSI-RS ports) is $v_k$, then the base station will replace $e_k$ in the original pre-coding matrix with $v_k$, and obtain a pre-coding matrix in the second pre-coding matrix set. For example, if a pre-coding matrix in the pre-coding matrix set corresponding to the selected CSI-RS ports is:

$$W = \beta \begin{bmatrix} e_{k_1} & e_{k_3} & \cdots & e_{k_{2r-1}} \\ \alpha_1 e_{k_2} & \alpha_2 e_{k_4} & \cdots & \alpha_r e_{k_{2r}} \end{bmatrix}.$$

Then a pre-coding matrix in the second pre-coding matrix set used by the base station for pre-coding in downlink transmission will be:

$$W = \beta \begin{bmatrix} v_{k_1} & v_{k_3} & \cdots & v_{k_{2r-1}} \\ \alpha_1 v_{k_2} & \alpha_2 v_{k_4} & \cdots & \alpha_r v_{k_{2r}} \end{bmatrix},$$

where $v_{k_1}$ is a beam-forming vector for the k1-th CSI-RS resource or group of ports.

In some embodiment of the disclosure, the i-th physical resource in the prescribed sub-band corresponds to the k-th pre-coding matrix in the second pre-coding matrix set, where: k=i mod K, where i=0, 1, 2 . . . N, k=0, 1, 2, 3, . . . , K−1, K is the number of pre-coding matrixes in the second pre-coding matrix set, and N is the number of physical resources in the sub-band; or, k=ceil(i,v) mod K, where ceil(i/v) represents the minimum integer no less than i/v, v=RI, or v is the number of antenna ports, i=0, 1, 2 . . . N, k=0, 1, 2, 3, . . . , K−1, K is the number of pre-coding matrixes in the second pre-coding matrix set, and N is the number of physical resources in the sub-band.

Here the prescribed sub-band, the physical resources, and the phase set can be the same as described in the embodiment above, so a repeated description thereof will be omitted here.

As can be apparent, In the embodiments above, when pre-coding data, the base station determines the corresponding pre-coding matrix set and one or more beam-form vectors according to the indication information of the one or more selected CSI-RS resources in the prescribed sub-band or according to the indication information of the one or more selected CSI-RS ports in the prescribed sub-band, fed back by the terminal, and further pre-codes the data to be transmitted over the one or more physical resources in the prescribed sub-band according to both the determined pre-coding matrix set and the one or more determined beam-forming vectors. On one hand, in the embodiment of the disclosure, the base station pre-codes over each physical resource by using a pre-coding matrix corresponding to the physical resource according to the pre-coding matrixes in the pre-coding matrix set, so that the pre-coded data can be better matched with a channel state than the existing technology in which data is pre-coded based upon only one pre-coding matrix. On the other hand, in the case that the base station beam-forms CSI-RS's transmitted over different CSI-RS resources or CSI-RS ports using the different beam-ing-form vectors, the base station can determine the corresponding beaming-form vectors according to the indication information, of the CSI-RS ports or the CSI-RS ports, fed back by the terminal, and pre-code over the different physical resources using the corresponding beaming-form vectors and pre-coding matrixes, so that the extent of matching the pre-coded data with a channel state can be further improved over the existing technology so as to guarantee the performance of downlink transmission, and particularly in a scenario of mobility at a high speed, a stable gain of pre-coding can be guaranteed, the performance can be improved significantly over the traditional MIMO transmission solution, and also each data stream can traverse the different column vectors in the pre-coding matrix, so there will be an insignificant difference between SINRs of the respective data streams to thereby further avoid the problem of unequaled SINRs of different data streams corresponding to a codeword.

Based upon the same technical ideal, an embodiment of the disclosure further provides a terminal.

Figure 6:
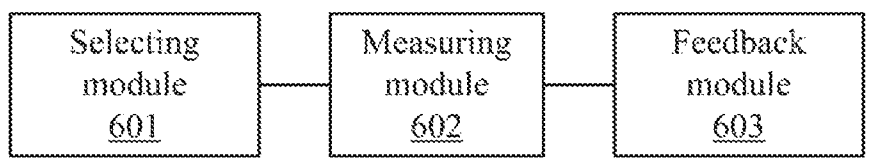
FIG. 6 is a schematic structural diagram of a terminal according to an embodiment of the disclosure.

Referring to FIG. 6 which is a schematic structural diagram of a terminal according to an embodiment of the disclosure, the terminal can perform the flow above of providing feedback of CSI at the terminal side. As illustrated in FIG. 6, the terminal according to the embodiment of the disclosure includes: a selection module 601, a measuring module 602 and a feedback module 603.

The selecting module 601 is configured to select one or more CSI-RS resources in a prescribed sub-band or one or more CSI-RS ports in the prescribed sub-band, from a CSI-RS resource set configured by a base station according to downlink channel information.

The measuring module 602 is measure one or more CQIs according to the one or more selected CSI-RS resources or according to the one or more selected CSI-RS ports, and according to a pre-coding matrix set corresponding to the one or more selected CSI-RS resources or corresponding to the one or more selected CSI-RS ports, where the pre-coding matrix set includes one or more pre-coding matrixes, and each of one or more physical resources in the prescribed sub-band corresponds to one of the one or more pre-coding matrixes in the pre-coding matrix set.

The feedback module 603 is configured to provide feedback of the one or more CQIs, and feedback of indication information of the one or more selected CSI-RS resources or feedback of indication information of the one or more selected CSI-RS ports.

In an implementation, the measuring module 602 is configured to measure the one or more CQIs according to the downlink channel information, and according to one or more pre-coding matrixes corresponding to the one or more physical resources in the prescribed sub-band, where the one or more pre-coding matrixes are one or more pre-coding matrixes in the pre-coding matrix set corresponding to the one or more selected CSI-RS resources or corresponding to the one or more selected CSI-RS ports.

In an implementation, the selecting module 601 is configured to select the one or more CSI-RS resources in the prescribed sub-band from the CSI-RS resource set configured by the base station.

And the measuring module 602 is configured to: measure one or more CQIs for downlink channel information corresponding to each of the one or more selected CSI-RS resources according to the pre-coding matrix set, and obtain the one or more CQIs corresponding to each of the one or more selected CSI-RS resources; or, combine the downlink channel information corresponding to each of the selected CSI-RS resources, measure a CQI for the combined downlink channel information according to the pre-coding matrix set, and obtain a joint CQI corresponding to the selected CSI-RS resources.

In an implementation, the selecting module 601 is configured to elect the one or more CSI-RS ports in the prescribed sub-band from the CSI-RS resource set configured by the base station.

And the measuring module 602 is configured to: measure one or more CQIs for downlink channel information corresponding to the one or more selected CSI-RS ports according to the pre-coding matrix set, and obtain the one or more CQIs corresponding to the one or more selected CSI-RS ports; or, measure one or more CQIs according to downlink channel information corresponding to one or more CSI-RS resources configured by the base station, and according to the pre-coding matrix set corresponding to the one or more selected CSI-RS ports, and obtain the one or more CQIs corresponding to the one or more selected CSI-RS ports.

In an implementation, the selecting module 601 is configured to select the one or more CSI-RS resources in the prescribed sub-band or the one or more CSI-RS ports in the prescribed sub-band from the CSI-RS resource set configured by the base station based upon a predetermined RI and based upon downlink channel information.

In an implementation, the selecting module 601 can determine the number of the one or more selected CSI-RS resources or the number of the one or more selected CSI-RS ports according to the RI.

In an implementation, the RI is an RI lastly fed back by the terminal; or the RI is indicated by the base station to the terminal.

In an implementation, the selecting module 601 is configured to: determine transmission performance information corresponding to one or more CSI-RS resources in the CSI-RS resource set configured by the base station or corresponding to one or more CSI-RS ports in the CSI-RS resource set configured by the base station according to the downlink channel information corresponding to the one or more CSI-RS resources in the CSI-RS resource set configured by the base station or corresponding to the one or more CSI-RS ports in the CSI-RS resource set configured by the base station; or determine transmission performance information corresponding to the one or more CSI-RS resources in the CSI-RS resource set configured by the base station or corresponding to the one or more CSI-RS ports in the CSI-RS resource set configured by the base station according to one or more results calculated from both a pre-coding matrix set and the downlink channel information corresponding to the one or more CSI-RS resources in the CSI-RS resource set configured by the base station or corresponding to the one or more CSI-RS ports in the CSI-RS resource set configured by the base station; and, select the one or more CSI-RS resources in the prescribed sub-band or the one or more CSI-RS ports in the prescribed sub-band from the CSI-RS resource set configured by the base station according to the determined transmission performance information.

In an implementation, the indication information of the one or more selected CSI-RS resources is one or more indexes of the one or more selected CSI-RS resources in the CSI-RS resource set configured by the base station.

In an implementation, the indication information of the one or more selected CSI-RS ports is one or more indexes of the one or more selected CSI-RS ports among all CSI-RS ports included by one or more CSI-RS resources configured by the base station; or, the indication information of the one or more selected CSI-RS ports is one or more indexes, of the pre-coding matrix set corresponding to the one or more selected CSI-RS ports, in a predefined codebook.

In an implementation, the pre-coding matrix set corresponding to the one or more selected CSI-RS resources is agreed on in advance between the terminal and the base station.

In an implementation, each of the one or more pre-coding matrixes in the pre-coding matrix set corresponding to the one or more selected CSI-RS ports consists of one or more column selection vectors or a column selection vector group, where an element in each of the one or more column selection vectors is 1, and all other elements are 0; or, the pre-coding matrix set corresponding to the one or more selected CSI-RS ports is obtained according to one or more column selection vectors and according to a phase set, or according to both a column selection vector group and the phase set, where the phase set includes one or more phase factors, and each of the one or more pre-coding matrixes in the pre-coding matrix set is obtained based upon one of the one or more phase factors.

In an implementation, each column vector in each pre-coding matrix in the pre-coding matrix set corresponding to the one or more selected CSI-RS ports consists of M concatenated column selection vectors, M is the number of the one or more selected CSI-RS ports, one or more ports corresponding to M elements each having a value of 1 in the M column selection vectors constitute the one or more selected CSI-RS ports, and M is an integer more than or equal to 1.

In an implementation, obtaining the pre-coding matrix set according to the column selection vector and according to the phase set, or according to both the column selection vector group and the phase set includes: performing a Kronecker product operation on both a phase matrix obtained based upon a phase factor and the column selection vector or column selection vectors in the column selection vector group, and constituting a pre-coding matrix consisting of column vectors in a matrix obtained as a result of the operation.

In an implementation, an i-th physical resource in the prescribed sub-band corresponds to a k-th pre-coding matrix in the pre-coding matrix set. k=i mod K, where i=0, 1, 2 . . . N, k=0, 1, 2, 3, . . . , K−1, K is the number of the one or more pre-coding matrixes in the pre-coding matrix set, and N is the number of the one or more physical resources in the sub-band. Or, k=ceil(i/v) mod K, where ceil(i/v) represents a minimum integer no less than i/v, v=RI, or v is the number of one or more antenna ports, i=0, 1, 2 . . . N, k=0, 1, 2, 3, . . . , K−1, K is the number of the one or more pre-coding matrixes in the pre-coding matrix set, and N is the number of the one or more physical resources in the sub-band.

Here the prescribed sub-band, the physical resource, the phase set, and the phase matrix can be the same as described in the embodiment above, so a repeated description thereof is omitted here.

Based upon the same technical idea, an embodiment of the disclosure further provides a base station.

Figure 7:
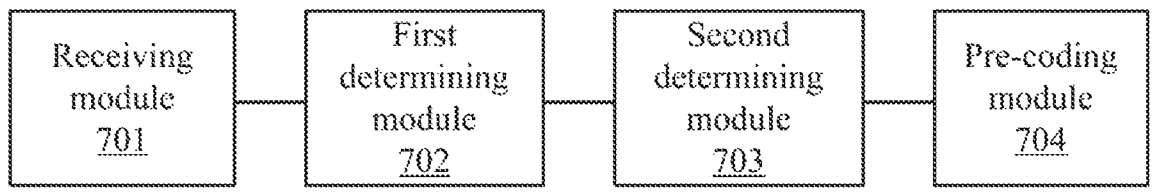
FIG. 7 is a schematic structural diagram of a base station according to an embodiment of the disclosure.

Referring to FIG. 7 which is a schematic structural diagram of a base station according to an embodiment of the disclosure, the base station can perform the flow above of pre-coding at the base station side. As illustrated in FIG. 7, the base station according to the embodiment of the disclosure includes: a receiving module 701, a first determining module 702, a second determining module 703, and a pre-coding module 704.

The receiving module 701 is configured to receive feedback of one or more CQIs, and feedback of indication information of one or more selected CSI-RS resources in a prescribed sub-band or feedback of indication information of one or more selected CSI-RS ports in the prescribed sub-band, fed back by a terminal.

A first determining module 702 is configured to determine a modulation and coding scheme for downlink transmission according to the one or more CQIs.

A second determining module 703 is configured to determine a pre-coding matrix set and one or more beam-forming vectors according to the indication information of the one or more selected CSI-RS resources in the prescribed sub-band or according to the indication information of the one or more selected CSI-RS ports in the prescribed sub-band.

A pre-coding module 704 is configured to pre-code data to be transmitted over one or more physical resources in the prescribed sub-band according to both the determined pre-coding matrix set and the one or more determined beam-forming vectors.

In an implementation, the pre-coding matrix set and the one or more beam-forming vectors are determined by the second determining module according to the indication information of the one or more selected CSI-RS resources or according to the indication information of the one or more CSI-RS ports in the prescribed sub-band. And further the pre-coding module 704 is configured to: perform a calculation operation on both one or more pre-coding matrixes in a determined first pre-coding matrix set and the one or more determined beam-forming vectors, and obtain a second pre-coding matrix set for pre-coding, where the second pre-coding matrix set includes one or more pre-coding matrixes, and each physical resource in the prescribed sub-band corresponds to one of the one or more pre-coding matrixes in the second pre-coding matrix set; and pre-code the data to be transmitted over the one or more physical resources in the prescribed sub-band according to the one or more pre-coding matrixes in the second pre-coding matrix set.

In an implementation, the pre-coding matrix set and the one or more beam-forming vectors are determined by the second determining module according to the indication information of the one or more selected CSI-RS ports in the prescribed sub-band. And further the pre-coding module 704 is configured to: replace each column selection vector in each pre-coding matrix in the determined pre-coding matrix set with one of the one or more beam-form vectors corresponding to the column selection vector, respectively, and obtain the second pre-coding matrix set for pre-coding, where each column vector in each pre-coding matrix consists of M concatenated column selection vectors, each column of the M selection vectors corresponds to a CSI-RS port, the second pre-coding matrix set includes one or more pre-coding matrixes, each physical resource in the prescribed sub-band corresponds to one of the one or more pre-coding matrixes in the second pre-coding matrix set, and M is an integer more than or equal to 1; and, pre-code the data to be transmitted over the physical resources in the prescribed sub-band according to the one or more pre-coding matrixes in the second pre-coding matrix set.

In an implementation, an i-th physical resource in the prescribed sub-band corresponds to a k-th pre-coding matrix in the second pre-coding matrix set, where: k=i mod K, where i=0, 1, 2 . . . N, k=0, 1, 2, 3, . . . , K−1, K is the number of the one or more pre-coding matrixes in the second pre-coding matrix set, and N is the number of the one or more physical resources in the sub-band; or, k=ceil(i/v) mod K, where ceil(i/v) represents a minimum integer no less than i/v, v=RI, or v is the number of one or more antenna ports, i=0, 1, 2 . . . N, k=0, 1, 2, 3, . . . , K−1, K is the number of the one or more pre-coding matrixes in the second pre-coding matrix set, and N is the number of the one or more physical resources in the sub-band.

In an implementation, the indication information of the one or more selected CSI-RS resources is one or more indexes of the one or more selected CSI-RS resources in a CSI-RS resource set configured by the base station.

In an implementation, the indication information of the one or more selected CSI-RS ports is one or more indexes of the one or more selected CSI-RS ports among all CSI-RS ports included by one or more CSI-RS resources configured by the base station; or, the indication information of the one or more selected CSI-RS ports is one or more indexes, of the pre-coding matrix set corresponding to the one or more selected CSI-RS ports, in a predefined codebook.

Here the pre-coding matrix set corresponding to the selected CSI-RS resource, the pre-coding matrix set corresponding to the selected CSI-RS port, the prescribed sub-band, the physical resource, the phase set, and the phase matrix can be the same as described in the embodiment above, so a repeated description thereof is omitted here.

Based upon the same technical idea, another embodiment of the disclosure further provides a terminal, and the terminal can perform the flow above of providing feedback of CSI at the terminal side.

Figure 8:
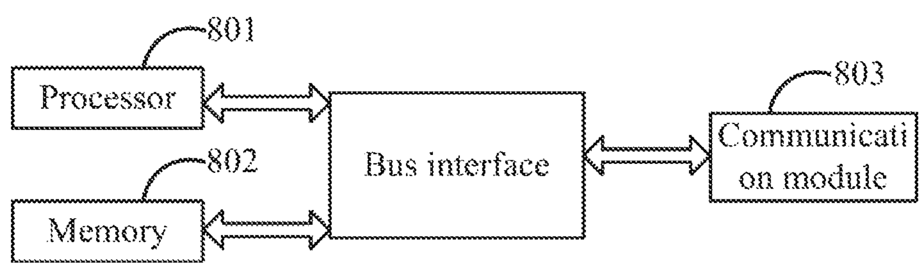
FIG. 8 is a schematic structural diagram of a terminal according to another embodiment of the disclosure.

Referring to FIG. 8 which is a schematic structural diagram of a terminal according to an embodiment of the disclosure. The terminal can perform the flow above of providing feedback of CSI at the terminal side. As illustrated, the terminal can include a processor 801, a memory 802, a communication module 803, and a bus interface.

The processor 801 is responsible for managing bus architecture and performing normal processes, and the memory 802 can store data for use by the processor 801 in performing operations. The communication module 803 is configured to be controlled by the processor 801 to receive and transmit data.

The bus architecture can include any number of interconnecting buses and bridges to particularly link together various circuits including one or more processors represented by the processor 801, and one or more memories represented by the memory 802. The bus architecture can further link together various other circuits, e.g., a peripheral device, a manostat, a power management circuit, etc., all of which are well known in the art, so a further description thereof will be omitted in this context. The bus interface serves as an interface. The processor 801 is responsible for managing the bus architecture and performing normal processes, and the memory 802 can store data for use by the processor 801 in performing operations.

The flow of providing feedback of CSI according to the embodiment of the disclosure can be applied to the processor 801, or performed by the processor 801. In an implementation, the respective operations in the flow of processing a signal can be performed by integrated logic circuits in hardware, or instructions in software, in the processor 801. The processor 801 can be a general-purpose processor, a digital signal processor, an application specific integrated circuit, a field programmable gate array, or another programmable logic device, discrete gate, transistor logic device, or discrete hardware component. The respective methods, operations, and logic block diagrams disclosed in the embodiments of the disclosure can be implemented or performed. The general-purpose processor can be a micro processor, or can be any conventional processor, etc. The operations in the method according to the embodiment of the disclosure can be performed directly by a hardware processor, or performed by a combination of hardware and software modules in the processor. The software module can be located in a random memory, a flash memory, a read-only memory, a programmable read-only memory, an electrically erasable and programmable memory, a register, or another storage medium known in the art. The storage medium is located in the memory 802, and the processor 801 reads the information in the memory 802, and performs the flow of providing feedback of CSI in combination with the hardware thereof.

Particularly, the processor 801 is configured to read program and data in the memory 802, and to perform the respective operations in the flow of providing feedback of CSI at the terminal side according to the embodiment above.

Based upon the same technical idea, another embodiment of the disclosure further provides a base station, and the base station can perform the flow above of pre-coding at the base station side.

Figure 9:
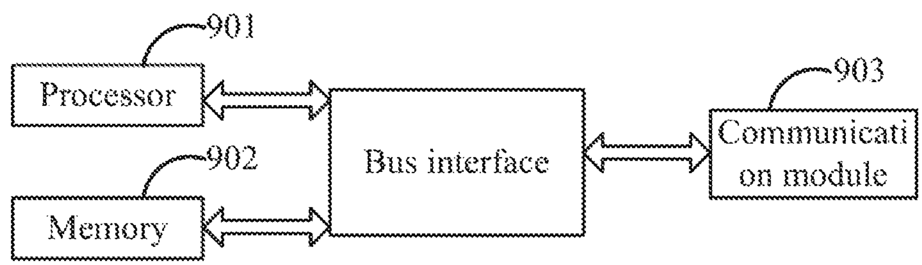
FIG. 9 is a schematic structural diagram of a base station according to another embodiment of the disclosure.

Referring to FIG. 9 which is a schematic structural diagram of a base station according to an embodiment of the disclosure. The base station can perform the flow above of pre-coding at the base station side. As illustrated, the base station can include a processor 901, a memory 902, a communication module 903, and a bus interface.

The processor 901 is responsible for managing a bus architecture and performing normal processes, and the memory 902 can store data for use by the processor 901 in performing operations. The communication module 903 is configured to be controlled by the processor 901 to receive and transmit data.

The bus architecture can include any number of interconnecting buses and bridges to particularly link together various circuits including one or more processors represented by the processor 901, and one or more memories represented by the memory 902. The bus architecture can further link together various other circuits, e.g., a peripheral device, a manostat, a power management circuit, etc., all of which are well known in the art, so a further description thereof will be omitted in this context. The bus interface serves as an interface. The processor 901 is responsible for managing the bus architecture and performing normal processes, and the memory 902 can store data for use by the processor 901 in performing operations.

The flow of pre-coding according to the embodiment of the disclosure can be applied to the processor 901, or performed by the processor 901. In an implementation, the respective operations in the flow of processing a signal can be performed by integrated logic circuits in hardware, or instructions in software, in the processor 901. The processor 901 can be a general-purpose processor, a digital signal processor, an application specific integrated circuit, a field programmable gate array, or another programmable logic device, discrete gate, transistor logic device, or discrete hardware component. The respective methods, operations, and logic block diagrams disclosed in the embodiments of the disclosure can be implemented or performed. The general-purpose processor can be a micro processor, or can be any conventional processor, etc. The operations in the method according to the embodiment of the disclosure can be performed directly by a hardware processor, or performed by a combination of hardware and software modules in the processor. The software module can be located in a random memory, a flash memory, a read-only memory, a programmable read-only memory, an electrically erasable and programmable memory, a register, or another storage medium known in the art. The storage medium is located in the memory 902, and the processor 901 reads the information in the memory 902, and performs the flow of pre-coding in combination with the hardware thereof.

Particularly the processor 901 is configured to read program and data in the memory 902, and to perform the respective operations in the flow of pre-coding at the base station side according to the embodiment above.

The disclosure has been described in a flow chart and/or a block diagram of the method, the device (system) and the computer program product according to the embodiments of the disclosure. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide operations for performing the functions specified in the flow(s) of the flow chart and/or the block(s) of the block diagram.

Although the preferred embodiments of the disclosure have been described, those skilled in the art benefiting from the underlying inventive concept can make additional modifications and variations to these embodiments. Therefore the appended claims are intended to be construed as encompassing the preferred embodiments and all the modifications and variations coming into the scope of the disclosure.

Evidently those skilled in the art can make various modifications and variations to the disclosure without departing from the spirit and scope of the disclosure. Thus the disclosure is also intended to encompass these modifications and variations thereto so long as the modifications and variations come into the scope of the claims appended to the disclosure and their equivalents.

The invention claimed is:

1. A method for providing feedback of Channel State Information (CSI), comprising:

selecting, by a terminal, one or more Channel State Information-Reference Signal (CSI-RS) resources in a prescribed sub-band or one or more CSI-RS ports in the prescribed sub-band, from a CSI-RS resource set configured by a base station according to downlink channel information;

measuring, by the terminal, one or more Channel Quality Indicators (CQIs) according to the one or more selected CSI-RS resources or according to the one or more selected CSI-RS ports, and according to a pre-coding matrix set corresponding to the one or more selected CSI-RS resources or corresponding to the one or more selected CSI-RS ports, wherein the pre-coding matrix set comprises one or more pre-coding matrixes, and each of one or more physical resources in the prescribed sub-band corresponds to one of the one or more pre-coding matrixes in the pre-coding matrix set; and providing, by the terminal, feedback of the one or more CQIs, and feedback of indication information of the one or more selected CSI-RS resources or feedback of indication information of the one or more selected CSI-RS ports.

2. The method according to claim 1, wherein measuring, by the terminal, the one or more CQIs according to the one or more selected CSI-RS resources or according to the one or more selected CSI-RS ports, and according to the pre-coding matrix set corresponding to the one or more selected CSI-RS resources or corresponding to the one or more selected CSI-RS ports comprises:

measuring, by the terminal, the one or more CQIs according to the downlink channel information, and according to one or more pre-coding matrixes corresponding to the one or more physical resources in the prescribed sub-band, wherein the one or more pre-coding matrixes are one or more pre-coding matrixes in the pre-coding matrix set corresponding to the one or more selected CSI-RS resources or corresponding to the one or more selected CSI-RS ports.

3. The method according to claim 1, wherein measuring, by the terminal, the one or more CQIs according to the one or more selected CSI-RS resources, and according to the pre-coding matrix set corresponding to the one or more selected CSI-RS resources comprises:

measuring, by the terminal, one or more CQIs for downlink channel information corresponding to each of the one or more selected CSI-RS resources according to the pre-coding matrix set, and obtaining the one or more CQIs corresponding to each of the one or more selected CSI-RS resources; or combining, by the terminal, the downlink channel information corresponding to each of the selected CSI-RS resources, measuring a CQI for the combined downlink channel information according to the pre-coding matrix set, and obtaining a joint CQI corresponding to the selected CSI-RS resources;

or, wherein measuring, by the terminal, the one or more CQIs according to the one or more selected CSI-RS ports, and according to the pre-coding matrix set corresponding to the one or more selected CSI-RS ports comprises:

measuring, by the terminal, one or more CQIs for downlink channel information corresponding to the one or more selected CSI-RS ports according to the pre-coding matrix set, and obtaining the one or more CQIs corresponding to the one or more selected CSI-RS ports; or measuring, by the terminal, one or more CQIs according to downlink channel information corresponding to one or more CSI-RS resources configured by the base station, and according to the pre-coding matrix set corresponding to the one or more selected CSI-RS ports, and obtaining the one or more CQIs corresponding to the one or more selected CSI-RS ports.

4. The method according to claim 1, wherein selecting, by the terminal, the one or more CSI-RS resources in the prescribed sub-band or the one or more CSI-RS ports in the prescribed sub-band from the CSI-RS resource set configured by the base station according to the downlink channel information comprises:

determining, by the terminal, transmission performance information corresponding to one or more CSI-RS resources in the CSI-RS resource set configured by the base station or corresponding to one or more CSI-RS ports in the CSI-RS resource set configured by the base station according to the downlink channel information corresponding to the one or more CSI-RS resources in the CSI-RS resource set configured by the base station or corresponding to the one or more CSI-RS ports in the CSI-RS resource set configured by the base station; or determining, by the terminal, the transmission performance information corresponding to the one or more CSI-RS resources in the CSI-RS resource set configured by the base station or corresponding to the one or more CSI-RS ports in the CSI-RS resource set configured by the base station according to one or more results calculated from both a pre-coding matrix set and the downlink channel information corresponding to the one or more CSI-RS resources in the CSI-RS resource set configured by the base station or corresponding to the one or more CSI-RS ports in the CSI-RS resource set configured by the base station; and selecting, by the terminal, the one or more CSI-RS resources in the prescribed sub-band or the one or more CSI-RS ports in the prescribed sub-band from the CSI-RS resource set configured by the base station according to the determined transmission performance information.

5. The method according to claim 1, wherein the indication information of the one or more selected CSI-RS resources is one or more indexes of the one or more selected CSI-RS resources in the CSI-RS resource set configured by the base station;

or, wherein the indication information of the one or more selected CSI-RS ports is one or more indexes of the one or more selected CSI-RS ports among all CSI-RS ports comprised by one or more CSI-RS resources configured by the base station; or, the indication information of the one or more selected CSI-RS ports is one or more indexes, of the pre-coding matrix set corresponding to the one or more selected CSI-RS ports, in a predefined codebook.

6. The method according to claim 1, wherein the pre-coding matrix set corresponding to the one or more selected CSI-RS resources is agreed on in advance between the terminal and the base station.

7. The method according to claim 6, wherein each column vector in each pre-coding matrix in the pre-coding matrix set corresponding to the one or more selected CSI-RS ports consists of M concatenated column selection vectors, M is the number of the one or more selected CSI-RS ports, one or more ports corresponding to M elements each having a value of 1 in the M column selection vectors constitute the one or more selected CSI-RS ports, and M is an integer more than or equal to 1.

8. The method according to claim 1, wherein each of the one or more pre-coding matrixes in the pre-coding matrix set corresponding to the one or more selected CSI-RS ports consists of one or more column selection vectors or a column selection vector group, wherein an element in each of the one or more column selection vectors is 1, and all other elements are 0; or the pre-coding matrix set corresponding to the one or more selected CSI-RS ports is obtained according to one or more column selection vectors and according to a phase set, or according to both a column selection vector group and the phase set, wherein the phase set comprises one or more phase factors, and each of the one or more pre-coding matrixes in the pre-coding matrix set is obtained based upon one of the one or more phase factors.

9. A terminal, comprising:

a memory storing instructions; and a processor configured to execute the instructions to:

select one or more CSI-RS resources in a prescribed sub-band or one or more CSI-RS ports in the prescribed sub-band, from a CSI-RS resource set configured by a base station according to downlink channel information;

measure one or more CQIs according to the one or more selected CSI-RS resources or according to the one or more selected CSI-RS ports, and according to a pre-coding matrix set corresponding to the one or more selected CSI-RS resources or corresponding to the one or more selected CSI-RS ports, wherein the pre-coding matrix set comprises one or more pre-coding matrixes, and each of one or more physical resources in the prescribed sub-band corresponds to one of the one or more pre-coding matrixes in the pre-coding matrix set; and provide feedback of the one or more CQIs, and feedback of indication information of the one or more selected CSI-RS resources or feedback of indication information of the one or more selected CSI-RS ports.

10. The terminal according to claim 9, wherein the processor is further configured to execute the instructions to:

measure the one or more CQIs according to the downlink channel information, and according to one or more pre-coding matrixes corresponding to the one or more physical resources in the prescribed sub-band, wherein the one or more pre-coding matrixes are one or more pre-coding matrixes in the pre-coding matrix set corresponding to the one or more selected CSI-RS resources or corresponding to the one or more selected CSI-RS ports.

11. The terminal according to claim 9, wherein the processor is configured to execute the instructions to select the one or more CSI-RS resources in the prescribed sub-band from the CSI-RS resource set configured by the base station; and, the processor is further configured to execute the instructions to:

measure one or more CQIs for downlink channel information corresponding to each of the one or more selected CSI-RS resources according to the pre-coding matrix set, and obtain the one or more CQIs corresponding to each of the one or more selected CSI-RS resources; or, combine the downlink channel information corresponding to each of the selected CSI-RS resources, measure a CQI for the combined downlink channel information according to the pre-coding matrix set, and obtain a joint CQI corresponding to the selected CSI-RS resources;

or, wherein the processor is configured to execute the instructions to select the one or more CSI-RS ports in the prescribed sub-band from the CSI-RS resource set configured by the base station; and the processor is further configured to execute the instructions to:

measure one or more CQIs for downlink channel information corresponding to the one or more selected CSI-RS ports according to the pre-coding matrix set, and obtain the one or more CQIs corresponding to the one or more selected CSI-RS ports; or, measure one or more CQIs according to downlink channel information corresponding to one or more CSI-RS resources configured by the base station, and according to the pre-coding matrix set corresponding to the one or more selected CSI-RS ports, and obtain the one or more CQIs corresponding to the one or more selected CSI-RS ports.

12. The terminal according to claim 9, wherein the processor is further configured to execute the instructions to:

determine transmission performance information corresponding to one or more CSI-RS resources in the CSI-RS resource set configured by the base station or corresponding to one or more CSI-RS ports in the CSI-RS resource set configured by the base station according to the downlink channel information corresponding to the one or more CSI-RS resources in the CSI-RS resource set configured by the base station or corresponding to the one or more CSI-RS ports in the CSI-RS resource set configured by the base station; or determine transmission performance information corresponding to the one or more CSI-RS resources in the CSI-RS resource set configured by the base station or corresponding to the one or more CSI-RS ports in the CSI-RS resource set configured by the base station according to one or more results calculated from both a pre-coding matrix set and the downlink channel information corresponding to the one or more CSI-RS resources in the CSI-RS resource set configured by the base station or corresponding to the one or more CSI-RS ports in the CSI-RS resource set configured by the base station; and select the one or more CSI-RS resources in the prescribed sub-band or the one or more CSI-RS ports in the prescribed sub-band from the CSI-RS resource set configured by the base station according to the determined transmission performance information.

13. The terminal according to claim 9, wherein the indication information of the one or more selected CSI-RS resources is one or more indexes of the one or more selected CSI-RS resources in the CSI-RS resource set configured by the base station;

or wherein the indication information of the one or more selected CSI-RS ports is one or more indexes of the one or more selected CSI-RS ports among all CSI-RS ports comprised by one or more CSI-RS resources configured by the base station; or, the indication information of the one or more selected CSI-RS ports is one or more indexes, of the pre-coding matrix set corresponding to the one or more selected CSI-RS ports, in a predefined codebook.

14. The terminal according to claim 9, wherein the pre-coding matrix set corresponding to the one or more selected CSI-RS resources is agreed on in advance between the terminal and the base station.

15. The terminal according to claim 14, wherein each column vector in each pre-coding matrix in the pre-coding matrix set corresponding to the one or more selected CSI-RS ports consists of M concatenated column selection vectors, M is the number of the one or more selected CSI-RS ports, one or more ports corresponding to M elements each having a value of 1 in the M column selection vectors constitute the one or more selected CSI-RS ports, and M is an integer more than or equal to 1.

16. The terminal according to claim 9, wherein each of the one or more pre-coding matrixes in the pre-coding matrix set corresponding to the one or more selected CSI-RS ports consists of one or more column selection vectors or a column selection vector group, wherein an element in each of the one or more column selection vectors is 1, and all other elements are 0; or the pre-coding matrix set corresponding to the one or more selected CSI-RS ports is obtained according to one or more column selection vectors and according to a phase set, or according to both a column selection vector group and the phase set, wherein the phase set comprises one or more phase factors, and each of the one or more pre-coding matrixes in the pre-coding matrix set is obtained based upon one of the one or more phase factors.

* * * * *